United States Patent
Jang et al.

(10) Patent No.: US 12,348,764 B2
(45) Date of Patent: *Jul. 1, 2025

(54) INTER-PREDICTION-BASED IMAGE OR VIDEO CODING USING SBTMVP

(71) Applicant: LG ELECTRONICS INC., Seoul (KR)

(72) Inventors: Hyeongmoon Jang, Seoul (KR); Naeri Park, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,724

(22) Filed: Dec. 27, 2023

(65) Prior Publication Data

US 2024/0129522 A1    Apr. 18, 2024

Related U.S. Application Data

(63) Continuation of application No. 17/884,268, filed on Aug. 9, 2022, now Pat. No. 11,902,565, which is a continuation of application No. 17/545,927, filed on Dec. 8, 2021, now Pat. No. 11,445,213, which is a continuation of application No. PCT/KR2020/007713, filed on Jun. 15, 2020.

(60) Provisional application No. 62/861,282, filed on Jun. 13, 2019.

(51) Int. Cl.
*H04N 19/52* (2014.01)
*H04N 19/105* (2014.01)
*H04N 19/132* (2014.01)
*H04N 19/167* (2014.01)
*H04N 19/176* (2014.01)

(52) U.S. Cl.
CPC ........... *H04N 19/52* (2014.11); *H04N 19/105* (2014.11); *H04N 19/132* (2014.11); *H04N 19/167* (2014.11); *H04N 19/176* (2014.11)

(58) Field of Classification Search
CPC .. H04N 19/105; H04N 19/132; H04N 19/159; H04N 19/167; H04N 19/176; H04N 19/52

See application file for complete search history.

(56) References Cited

U.S. PATENT DOCUMENTS

2014/0016701 A1*  1/2014  Chen ................... H04N 19/172
                                                              375/240.14

FOREIGN PATENT DOCUMENTS

| AU | 2015203104 A1 | 7/2015 |
| CN | 104079944 A | 10/2014 |
| WO | 2015141977 A1 | 9/2015 |

OTHER PUBLICATIONS

"一 走用于 ~" (Adaptive interpolation~), Journal of PLA University of Science and Technology (Natural Science Edition), vol. 10, No. S (Dec. 2009).

* cited by examiner

*Primary Examiner* — Anner N Holder
(74) *Attorney, Agent, or Firm* — Bryan Cave Leighton Paisner LLP

(57) ABSTRACT

According to the disclosure of the present document, in a subblock-based temporal motion vector prediction (sbTMVP), a position of a subblock for deriving a motion vector per subblock unit can be efficiently calculated, and thus video/image coding efficiency can be increased and hardware implementation can be simplified.

3 Claims, 19 Drawing Sheets

FIG. 11
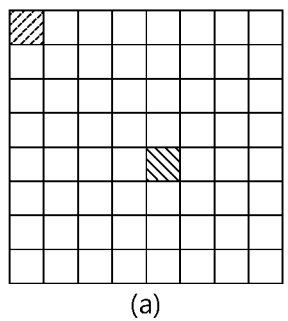
(a)
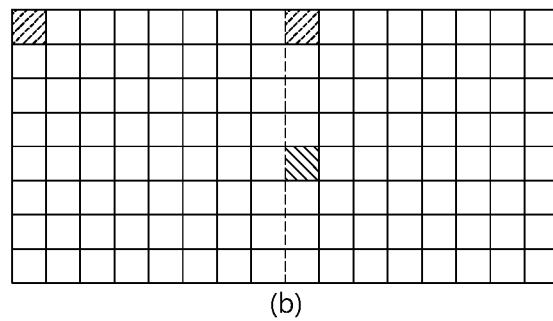
(b)
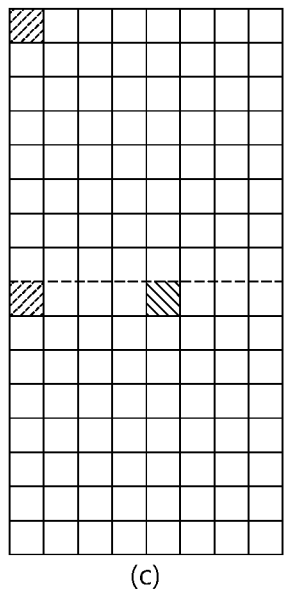
(c)
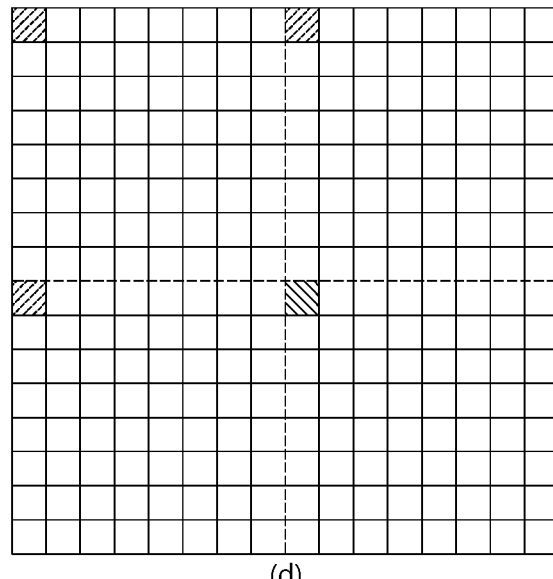
(d)

FIG. 12
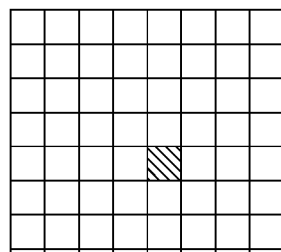
(a)
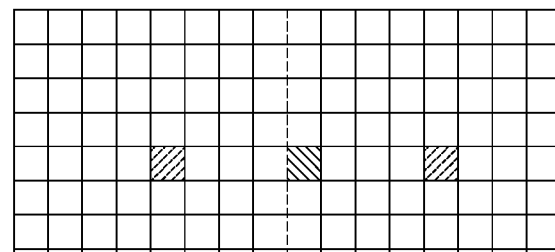
(b)
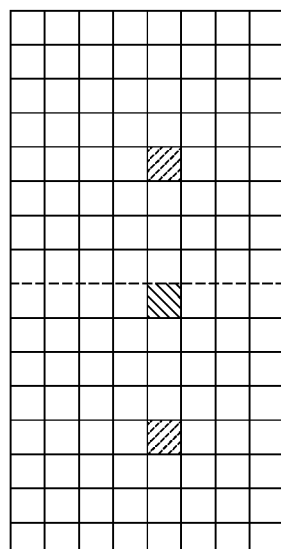
(c)
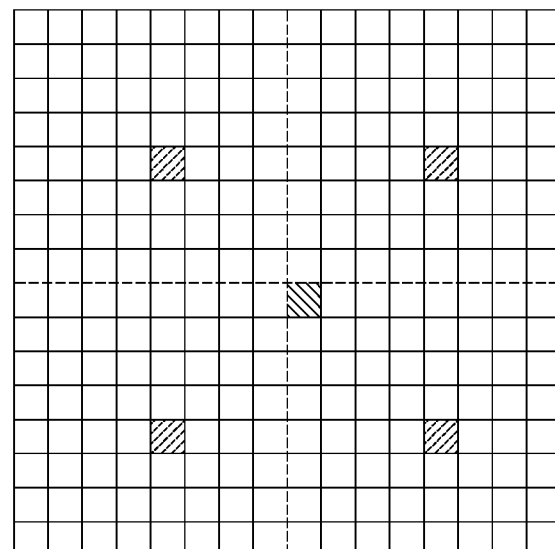
(d)

INTER-PREDICTION-BASED IMAGE OR VIDEO CODING USING SBTMVP

CROSS-REFERENCE TO PRIOR APPLICATIONS

This application is a Continuation of U.S. patent application Ser. No. 17/884,268, filed Aug. 9, 2022; which is a Continuation of U.S. patent application Ser. No. 17/545,927, filed Dec. 8, 2021, now U.S. Pat. No. 11,445,213; which is a Continuation of International Application No. PCT/KR2020/007713, filed Jun. 15, 2020, published on Dec. 17, 2020 as WO 2020/251319 A1; which claims priority to U.S. Provisional Application No. 62/861,282, filed Jun. 13, 2019, each hereby expressly incorporated by reference in its entirety.

BACKGROUND OF THE DISCLOSURE

Field of the Disclosure

The present disclosure relates to video or image coding, for example, an inter prediction-based image or video coding technology using subblock-based temporal motion vector prediction (sbTMVP).

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

Furthermore, in order to improve image/video coding efficiency, a subblock-based temporal motion vector prediction technology was discussed. To this end, there is a need for a scheme for efficiently performing a process of patching a motion vector of a subblock unit in a subblock-based temporal motion vector prediction.

SUMMARY

An object of this document is to provide a method and apparatus for improving video/image coding efficiency.

Another object of this document is to provide a method and apparatus for efficient inter prediction.

Still another object of this document is to provide a method and apparatus for improving prediction performance by deriving a subblock-based temporal motion vector.

Still another object of this document is to provide a method and apparatus for efficiently deriving a corresponding position of a subblock for deriving a subblock-based temporal motion vector.

Still another object of this document is to provide a method and apparatus for unifying a corresponding position having a sub-coding block level and a corresponding position having a coding block level for deriving a subblock-based temporal motion vector.

According to an embodiment of the present disclosure, a reference subblock for a current subblock may be derived based on the position of a sample located at the bottom right, among four samples positioned at the center of the current subblock in a subblock temporal motion vector prediction (sbTMVP).

According to an embodiment of the present disclosure, an sbTMVP candidate may be derived based on the availability of a reference subblock for a current subblock; for an available reference subblock, the motion vector of the available reference subblock is derived as the sbTMVP candidate, and for an unavailable reference subblock is not available, a base motion vector is derived as the sbTMVP candidate.

According to an embodiment of the present disclosure, the unavailable reference subblock may include a reference subblock positioned outside a reference picture or a reference subblock whose motion vector is not available, and for a reference subblock that is an intra mode, an IBC (intra block copy) mode, or a palette mode, the reference subblock may be a subblock whose motion vector is not available.

According to an embodiment of the present disclosure, there is provided a video/image decoding method performed by a decoding apparatus. The video/image decoding method may comprise methods disclosed in the embodiments of the present disclosure.

According to an embodiment of the present disclosure, there is provided a decoding apparatus that performs video/image decoding. The decoding apparatus may perform the methods disclosed in the embodiments of the present disclosure.

According to an embodiment of the present disclosure, there is provided a video/image encoding method performed by an encoding apparatus. The video/image encoding method may comprise methods disclosed in the embodiments of the present disclosure.

According to an embodiment of the present disclosure, there is provided an encoding apparatus that performs video/image encoding. The encoding apparatus may perform the methods disclosed in the embodiments of the present disclosure.

According to an embodiment of the present disclosure, there is provided a computer-readable digital storage medium storing encoded video/image information generated according to the video/image encoding method disclosed in at least one of the embodiments of the present disclosure.

According to an embodiment of the present disclosure, a computer-readable digital storage medium storing encoded information or encoded video/image information that causes a decoding apparatus to perform the video/image decoding method disclosed in at least one of the embodiments of the present disclosure.

This document may have various effects. For example, overall image/video compression efficiency can be improved. Furthermore, calculation complexity can be reduced and overall coding efficiency can be improved through efficient inter prediction. Furthermore, efficiency in terms of complexity and prediction performance can be improved because a corresponding position of a subblock for deriving a subblock-based temporal motion vector in subblock-based temporal motion vector prediction (sbTMVP) is efficiently calculated. Furthermore, a simplification effect in a hardware implementation aspect can be obtained because a method of calculating a corresponding position having a sub-coding block level and a corresponding position having a coding block level for deriving a subblock-based temporal motion vector are unified.

Effects which may be obtained through a detailed embodiment of this document are not limited to the listed effects. For example, there may be various technical effects which may be understood or derived from this document by a person having ordinary skill in the related art. Accordingly, detailed effects of this document are not limited to the effects explicitly described in this document, and may include various effects which may be understood or derived from a technical characteristic of this document.

BRIEF DESCRIPTION OF THE DRAWINGS

FIG. 11 is a schematic diagram illustrating a method for calculating corresponding positions for inducing a default MV and a subblock MV according to block size in the sbTMVP derivation process.

FIG. 12 is an exemplary view schematically illustrating a method for integrating corresponding positions for inducing a default MV and a subblock MV according to block size in the sbTMVP derivation process.

DESCRIPTION OF EXEMPLARY EMBODIMENTS

Figure 1:
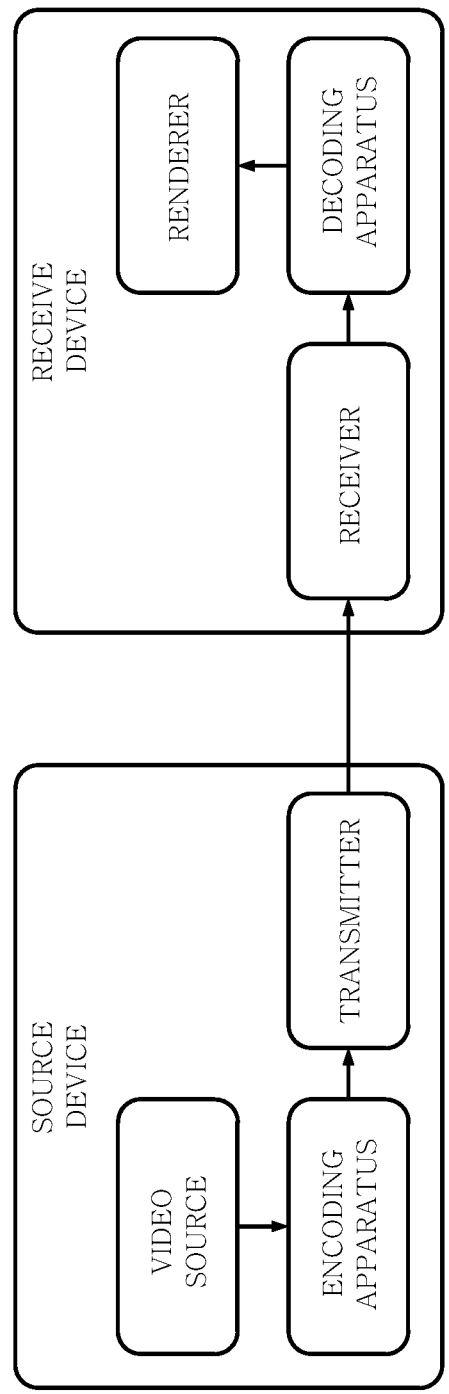
FIG. 1 schematically illustrates an example of a video/image coding system to which embodiments of this document may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

This document relates to video/image coding. For example, the methods/embodiments disclosed in this document may be applied to a method disclosed in the versatile video coding (VVC). Further, the methods/embodiments disclosed in this document may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In this document, technical features individually explained in one drawing may be individually implemented, or may be simultaneously implemented.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
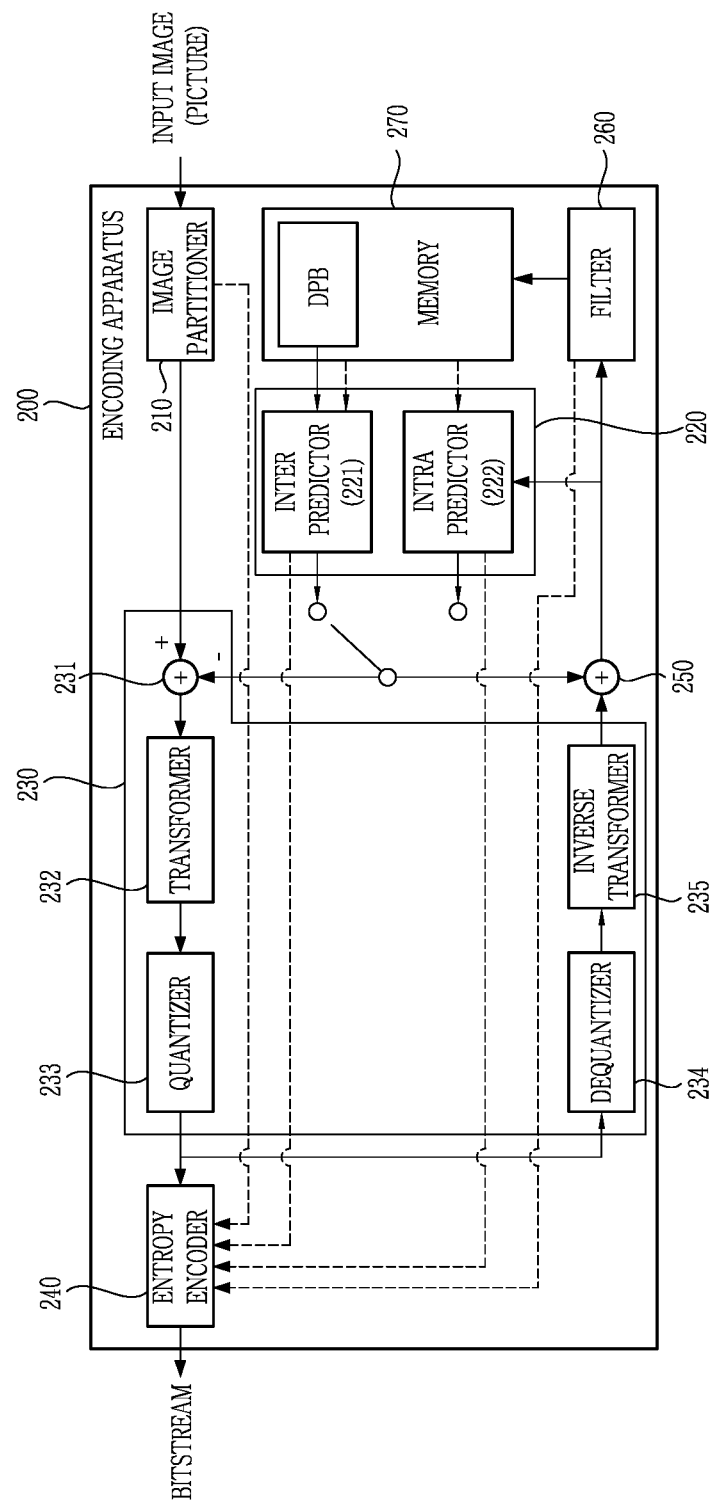
FIG. 2 is a schematic diagram illustrating a configuration of a video/image encoding apparatus to which the embodiments of the present document may be applied.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, B1 prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loave transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
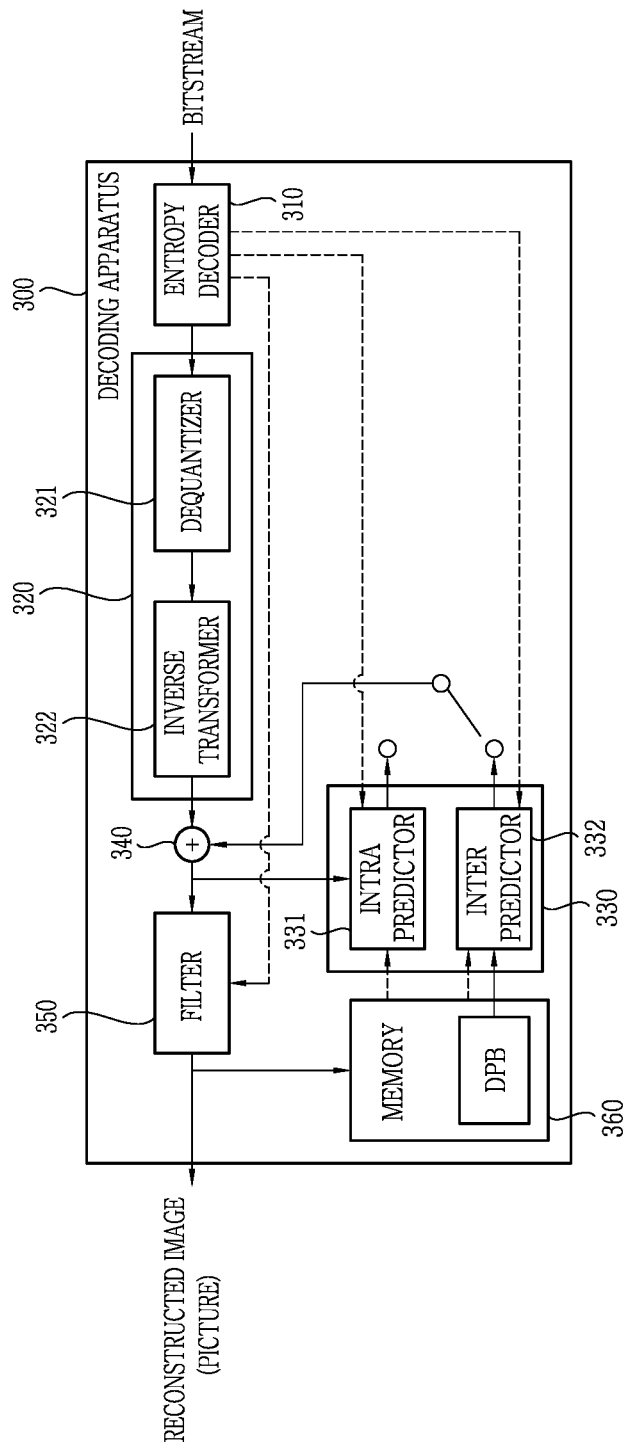
FIG. 3 is a schematic diagram illustrating a configuration of a video/image decoding apparatus to which the embodiments of the present document may be applied.

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, B1 prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, position information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, B1 prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, B1 prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, when inter prediction is applied to the current block, motion information of the current block may be used. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Figure 4:
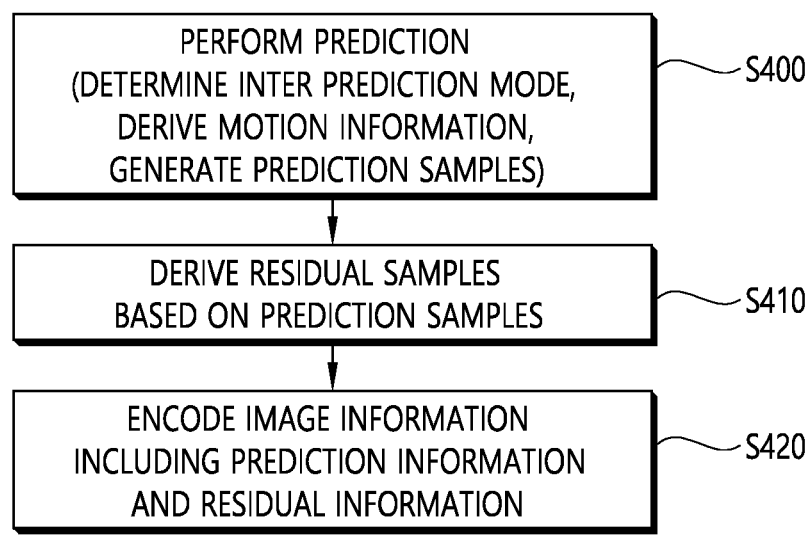
FIG. 4 illustrates one example of a video/image encoding method based on an inter prediction.
Figure 5:
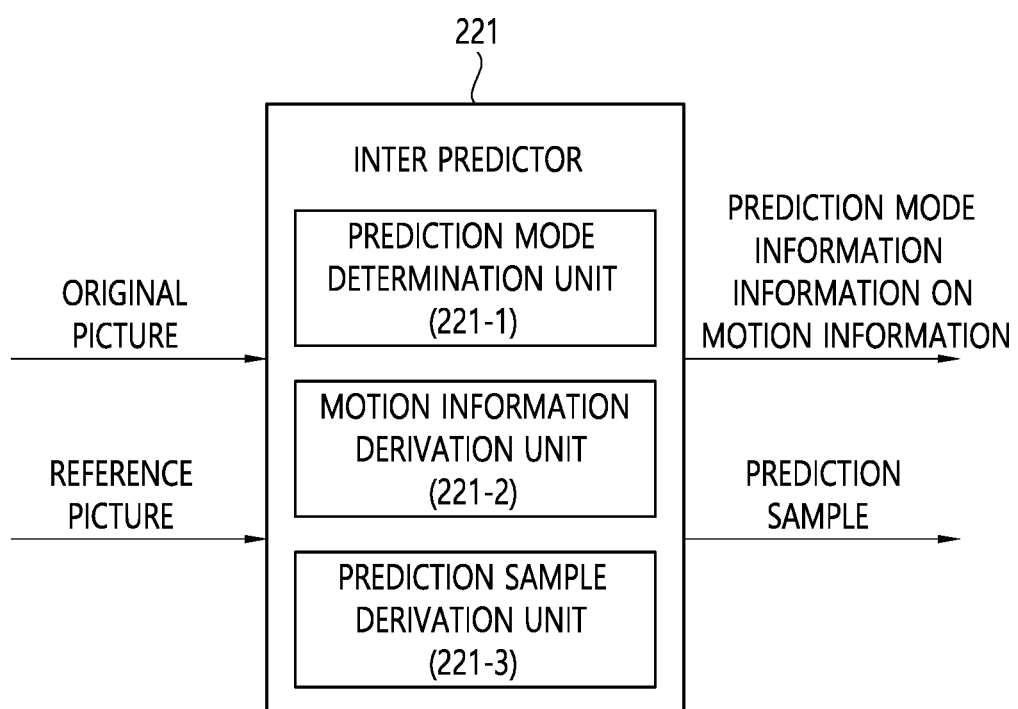
FIG. 5 illustrates one example schematically illustrating an inter-prediction unit in an encoding apparatus.

FIG. 4 illustrates one example of a video/image encoding method based on an inter prediction and FIG. 5 illustrates one example schematically illustrating an inter-prediction unit in an encoding apparatus. The inter-prediction unit in the encoding apparatus of FIG. 5 may also be applied to be the same as or correspond to the inter-prediction unit 221 of the encoding apparatus 200 of FIG. 2.

Referring to the FIGS. 4 and 5, the encoding apparatus performs the inter prediction for the current block (S400). The encoding apparatus may derive the inter prediction mode and the motion information of the current block and generate the prediction samples of the current block. Here, an inter prediction mode determining procedure, a motion information deriving procedure, and a generation procedure of the prediction samples may be simultaneously performed and any one procedure may be performed earlier than other procedures.

For example, the inter-prediction unit 221 of the encoding apparatus may include a prediction mode determination unit 221-1, a motion information derivation unit 221-2, and a prediction sample derivation unit 221-3, and the prediction mode determination unit 221-1 may determine the prediction mode for the current block, the motion information derivation unit 221-2 may derive the motion information of the current block, and the prediction sample derivation unit 221-3 may derive the prediction samples of the current block. For example, the inter-prediction unit 221 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding device may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering procedure may be further applied to the reconstruction picture as described above.

Figure 6:
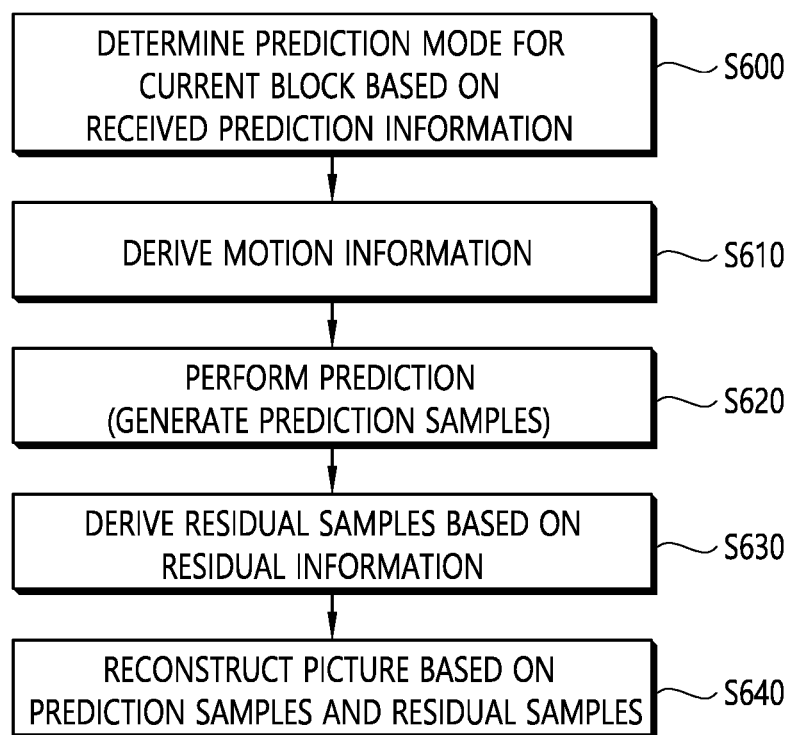
FIG. 6 illustrates one example of a video/image decoding method based on an inter prediction.
Figure 7:
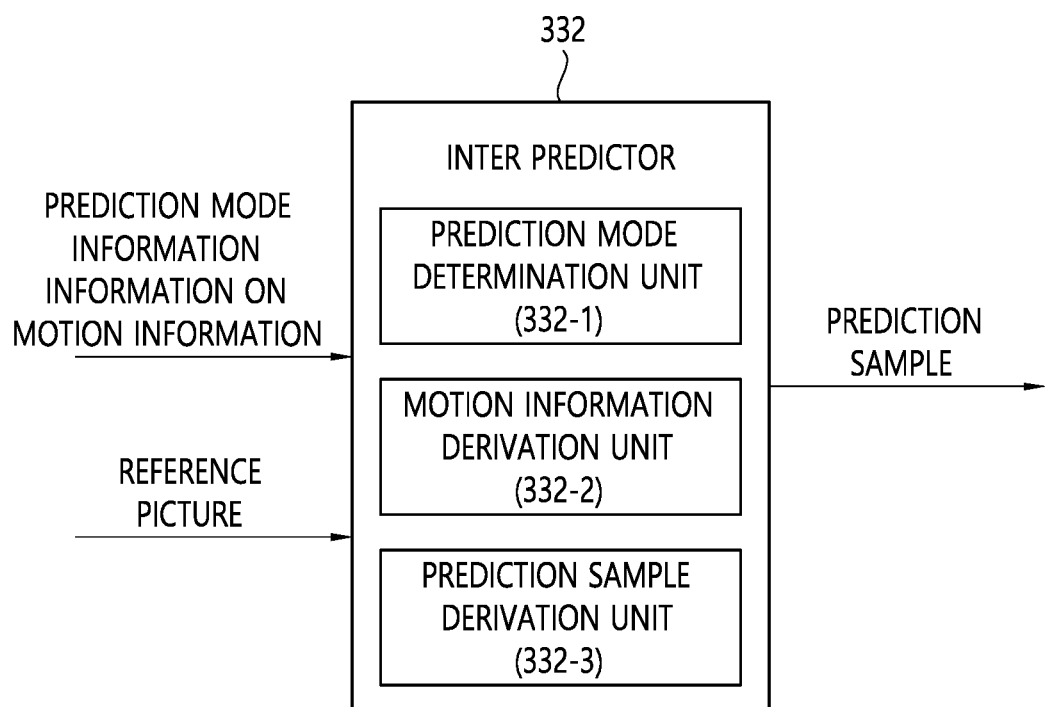
FIG. 7 illustrates one example schematically illustrating an inter-prediction unit in a decoding apparatus.

FIG. 6 illustrates one example of a video/image decoding method based on an inter prediction and FIG. 7 illustrates one example schematically illustrating an inter-prediction unit in a decoding apparatus. The inter-prediction unit in the decoding apparatus of FIG. 7 may also be applied to be the same as or correspond to the inter-prediction unit 332 of the decoding apparatus 300 of FIG. 3.

Referring to FIGS. 6 and 7, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S600). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes described above.

The decoding apparatus derives the motion information of the current block based on the determined inter prediction mode (S610). For example, when the skip mode or the merge mode is applied to the current block, the decoding device may configure the merge candidate list and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S620). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit 332 of the decoding apparatus may include a prediction mode determination unit 332-1, a motion information derivation unit 332-2, and a prediction sample derivation unit 332-3, and the prediction mode determination unit 332-1 may determine the prediction mode for the current block based on the received prediction mode information, the motion information derivation unit 332-2 may derive the motion information (the motion vector and/or reference picture index) of the current block based on the information on the received motion information, and the prediction sample derivation unit 332-3 may derive the predicted samples of the current block.

The decoding apparatus generates the residual samples for the current block based on the received residual information (S630). The decoding apparatus may generate the reconstruction samples for the current block based on the prediction samples and the residual samples and generate the reconstruction picture based on the generated reconstruction samples (S640). Thereafter, the in-loop filtering procedure may be further applied to the reconstruction picture as described above.

As described above, the inter prediction procedure may include an inter prediction mode determining step, a motion information deriving step depending on the determined prediction mode, and a prediction performing (predicted sample generating) step based on the derived motion information. The inter prediction procedure may be performed by the encoding apparatus and the decoding apparatus as described above.

Figure 8:
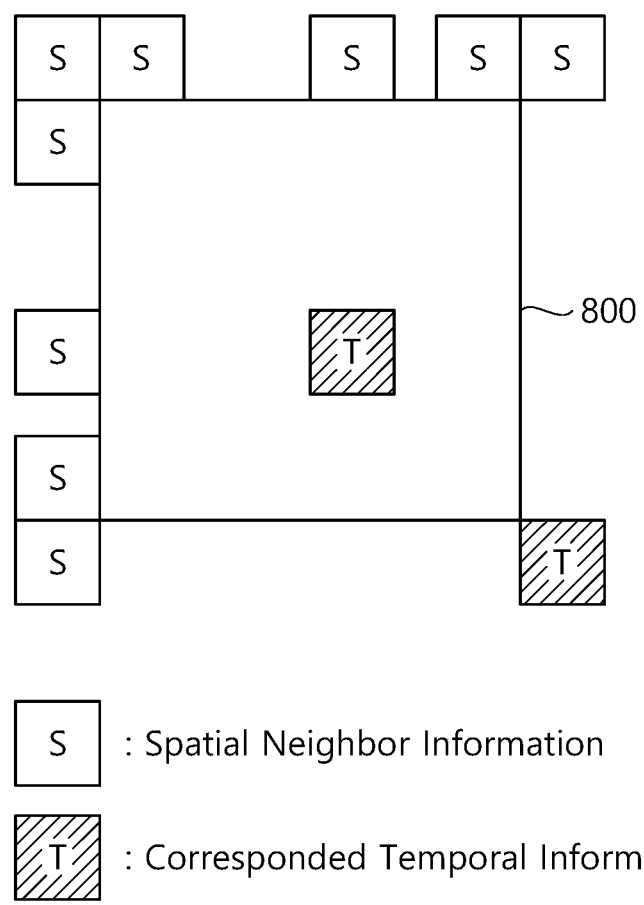
FIG. 8 exemplarily illustrates the spatial neighboring blocks and the temporal neighboring blocks of the current block.

FIG. 8 exemplarily illustrates the spatial neighboring blocks and the temporal neighboring blocks of the current block.

Referring to FIG. 8, the spatial neighboring block refers to neighboring blocks positioned around a current block 800, which is a target currently performing the inter prediction, and may include neighboring blocks positioned around a left of the current block 800 or neighboring blocks positioned around a top of the current block 800. For example, the spatial neighboring block may include a bottom-left corner neighboring block, a left neighboring block, a top-right corner neighboring block, a top neighboring block, and a top-left corner neighboring block of the current block 800. FIG. 8 illustrates the spatial neighboring blocks as "S".

According to an exemplary embodiment, the encoding apparatus/the decoding apparatus may detect available neighboring blocks by searching for the spatial neighboring blocks (e.g., the bottom-left corner neighboring block, the left neighboring block, the top-right corner neighboring block, the top neighboring block, and the top-left corner neighboring block) of the current block according to a predetermined order, and derive motion information of the detected neighboring blocks as a spatial motion information candidate.

The temporal neighboring block is a block positioned on a picture (i.e., reference picture) different from a current picture including the current block 800, and refers to a collocated block of the current block 800 in the reference picture. Here, the reference picture may be before or after the current picture on a picture order count (POC). Further, the reference picture used for deriving the temporal neighboring block may be referred to as a collocated reference picture or a col picture (collocated picture). Further, the collocated block may refer to a block located at a position in the col picture corresponding to the position of the current block 800, and be referred to as a col block. For example, as illustrated in FIG. 8, the temporal neighboring block may include a col block (i.e., col block including a bottom-right corner sample) positioned corresponding to a position of the bottom-right corner sample of the current block 800 in the reference picture (i.e., col picture) and/or a col block (i.e., col block including a center bottom-right sample) positioned corresponding to a position of the center bottom-right sample of the current block 800 in the reference picture (i.e., col picture). FIG. 8 illustrates the temporal neighboring blocks as "T".

According to the exemplary embodiment, the encoding apparatus/the decoding apparatus may detect an available block by searching for the temporal neighboring blocks (e.g., col block including the bottom-right corner sample and the col block including the center bottom-right sample) of the current block according to a predetermined order, and derive motion information of the detected block as a temporal motion information candidate. As described above, a technique using the temporal neighboring block may be referred to as a temporal motion vector prediction (TMVP). Also, the temporal motion information candidate may be referred to as a TMVP candidate.

Meanwhile, the prediction may also be performed by deriving the motion information in units of subblock according to the inter prediction mode. For example, in the affine mode or the TMVP mode, the motion information may be derived in units of subblock. Particularly, a method for deriving the temporal motion information candidate in units of subblock may be referred to as a subblock-based temporal motion vector prediction (sbTMVP).

The sbTMVP is a method using a motion field within a col picture in order to improve motion vector prediction (MVP) and a merge mode of coding units within a current picture. The col picture of the sbTMVP may be the same as a col picture used by a TMVP. However, in the TMVP, motion prediction is performed in a coding unit (CU) level. In contrast, in the sbTMVP, motion prediction may be performed in a subblock level or a sub coding unit (sub-CU) level. Furthermore, in the TMVP, temporal motion information is derived from a col block within a col picture (in this case, the col block is a col block corresponding to a below-right corner sample position of a current block or a center below-right sample position of the current block). In the sbTMVP, after a motion shift is applied from a col picture, temporal motion information is derived. In this case, the motion shift may include a process of obtaining a motion vector from one of spatial neighbor blocks of the current block and being shifted by the motion vector.

Figure 9:
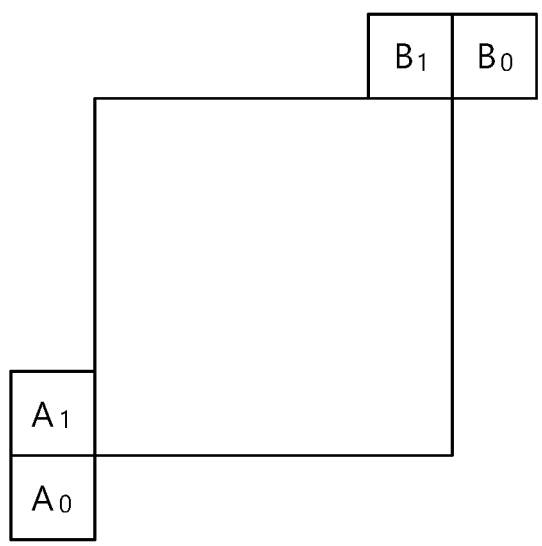
FIG. 9 exemplary illustrates temporal neighboring blocks used to derive a subblock-based temporal motion information candidate (sbTMVP candidate).

FIG. 9 exemplarily illustrates a spatial neighbor block which may be used to derive a subblock-based temporal motion information candidate (sbTMVP candidate).

Referring to FIG. 9, the spatial neighbor block may include at least one of a below-left corner neighbor block A0, a left neighbor block A1, an upper-right corner neighbor block B0, and an upper neighbor block B1 of a current block. In some cases, the spatial neighbor block may further include another neighbor block in addition to the neighbor blocks illustrated in FIG. 9 or may not include a specific neighbor block of the neighbor blocks illustrated in FIG. 9. Furthermore, the spatial neighbor block may include only a specific neighbor block, and for example, may include only the left neighbor block A1 of the current block.

For example, the encoding apparatus/decoding apparatus may first detect a motion vector of an available spatial neighbor block while searching spatial neighbor blocks in a predetermined search order, and may determine, as a col block (i.e., a collocated reference block), a block at a location indicated by a motion vector of the spatial neighbor block in a reference picture. In this case, the motion vector of the spatial neighbor block may be denoted as a temporal motion vector (temporal MV).

In this case, whether the spatial neighbor block is available may be determined by reference picture information, prediction mode information, position information, etc. of the spatial neighbor block. For example, if a reference picture of a spatial neighbor block and a reference picture of a current block are the same, it may be determined that the corresponding spatial neighbor block is available. Alternatively, if a spatial neighbor block is coded in a intra prediction mode or the spatial neighbor block is positioned outside a current picture/tile, it may be determined the corresponding spatial neighbor block is not available.

Furthermore, the search order of the spatial neighbor block may be variously defined, and may be in order of A1, B1, B0, and A0, for example. Alternatively, whether A1 is available may be determined by searching only A1.

Figure 10:
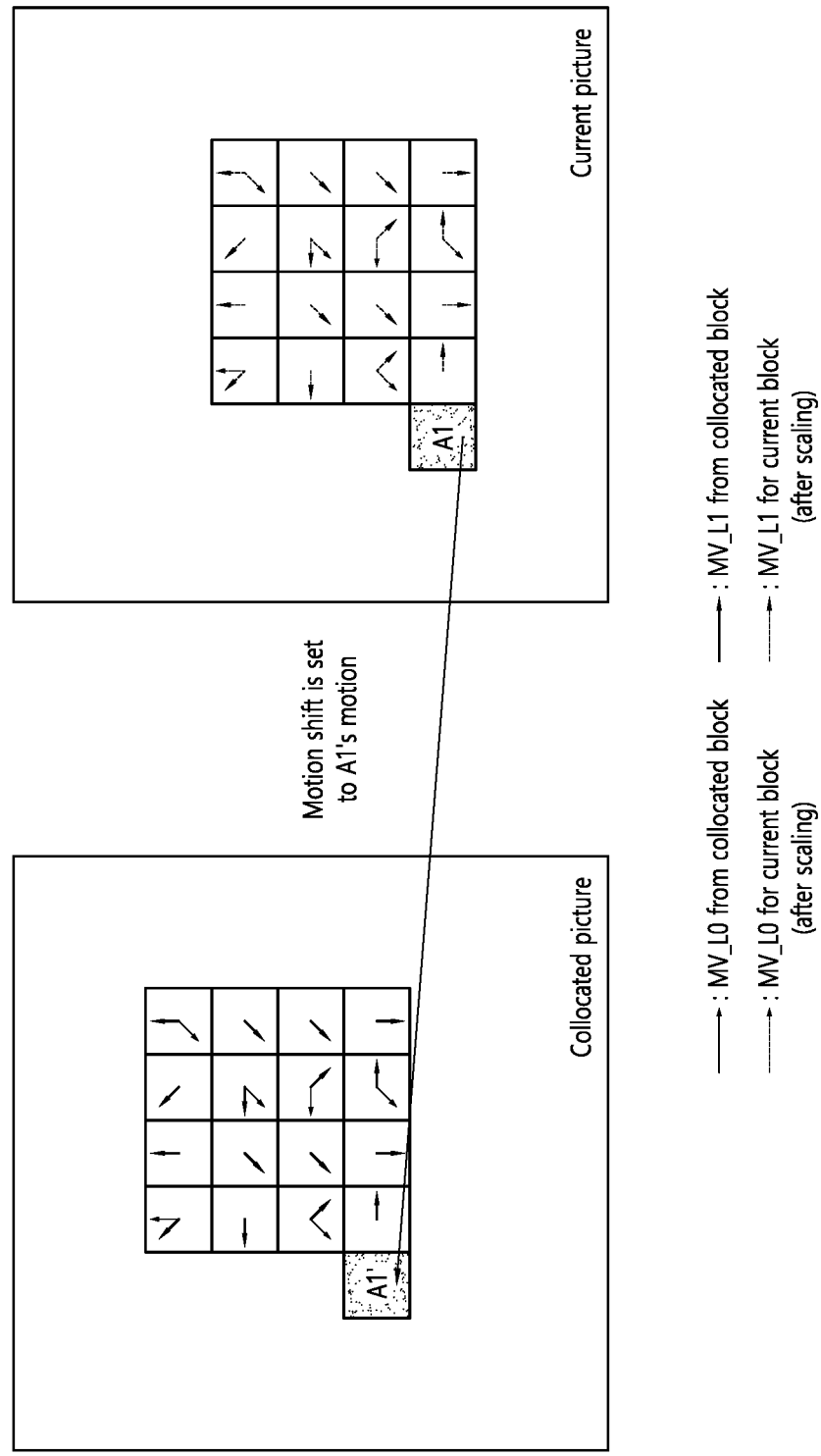
FIG. 10 is a schematic diagram illustrating a process for deriving a subblock-based temporal motion information candidate (sbTMVP candidate).

FIG. 10 is a diagram for schematically describing a process of deriving a subblock-based temporal motion information candidate (sbTMVP candidate).

Referring to FIG. 10, first, the encoding/decoding apparatus may determine whether a spatial neighbor block (e.g., A1 block) of a current block is available. For example, if a reference picture of the spatial neighbor block (e.g., A1 block) uses a col picture, it may be determined that the spatial neighbor block (e.g., A1 block) is available and a motion vector of the spatial neighbor block (e.g., A1 block) may be derived. In this case, the motion vector of the spatial neighbor block (e.g., A1 block) may be denoted as a temporal MV (tempMV), and the motion vector may be used in a motion shift. Alternatively if it is determined that the spatial neighbor block (e.g., A1 block) is not available, a temporal MV (i.e., a motion vector of the spatial neighbor block) may be set as a zero vector. In other words, in this case, a motion vector set to (0, 0) may be applied to the motion shift.

Next, the encoding/decoding apparatus may apply a motion shift based on the motion vector of the spatial neighbor block (e.g., A1 block). For example, the motion shift may be shifted (e.g., A1') to a position indicated by the motion vector of the spatial neighbor block (e.g., A1 block). That is, by applying the motion shift, the motion vector of the spatial neighbor block (e.g., A1 block) may be added to coordinates of the current block.

Next, the encoding/decoding apparatus may derive a motion-shifted collocated subblock (col subblock) on the col picture, and may obtain motion information (a motion vector, a reference index, etc.) of each col subblock. For example, the encoding/decoding apparatus may derive each col subblock on the col picture corresponding to a motion-shifted position (i.e., a position indicated by the motion vector of the spatial neighbor block (e.g., A1)) at each subblock position within the current block. Furthermore, the motion information of each col subblock may be used as motion information (i.e., sbTMVP candidate) of each subblock for the current block.

Furthermore, scaling may be applied to motion vectors of the col subblocks. The scaling may be performed based on a temporal distance difference between the reference picture of the col block and the reference picture of the current block. Accordingly, the scaling may be denoted as temporal motion scaling, and thus the reference pictures of the current block and the reference pictures of the temporal motion vectors may be arranged. In this case, the encoding/decoding apparatus may obtain the scaled motion vectors of the col subblocks as motion information of each subblock for the current block.

Furthermore, in deriving an sbTMVP candidate, motion information may not be present in a col subblock. In this case, with respect to a col subblock in which motion information is not present, base motion information (or default motion information) may be derived. The base motion information may be used as motion information of a subblock for a current block. The base motion information may be derived from a block positioned at the center of a col block (i.e., a col CU including col subblocks). For example, motion information (e.g., a motion vector) may be derived from a block including a sample positioned at the below-right among four samples positioned at the center of a col block, and may be used as base motion information.

As described above, in the case of an Affine mode or an sbTMVP mode in which motion information is derived in a subblock unit, affine merge candidates and an sbTMVP candidate may be derived, and a subblock-based merge candidate list may be configured based on these candidates. In this case, flag information indicating whether the affine mode or the sbTMVP mode is enabled or disabled may be signaled. If the sbTMVP mode is enabled based on flag information, the sbTMVP candidate derived as described above may be added to the firstly-ordered of the subblock-based merge candidate list. Furthermore, the affine merge candidates may be added to a next entry of the subblock-based merge candidate list. In this case, a maximum number of candidates of the subblock-based merge candidate list may be 5.

Furthermore, in the case of the sbTMVP mode, a subblock size may be fixed, and may be fixed to an 8×8 size, for example. Furthermore, the sbTMVP mode may be applied to only a block having both a width and height equal to or greater than 8.

Meanwhile, in a current VVC standard, as in Table 1, a subblock-based temporal motion information candidate (sbTMVP candidate) may be derived.

TABLE 1

1.1.1.1 Derivation process for subblock-based temporal merging candidates

Inputs to this process are:
    a luma location ( xCb, yCb ) of the top-left sample of the current luma coding block relative
    to the top-left luma sample of the current picture,
    a variable cbWidth specifying the width of the current coding block in luma samples,
    a variable cbHeight specifying the height of the current coding block in luma samples.
    the availability flag availableFlagA$_1$ of the neighbouring coding unit,
    the reference index refIdxLXA$_1$ of the neighbouring coding unit with X being 0 or 1,
    the prediction list utilization flag predFlagLXA$_1$ of the neighbouring coding unit with X being
    0 or 1,
    the motion vector in 1/16 fractional-sample accuracy mvLXA$_1$ of the neighbouring coding
    unit with X being 0 or 1.
Outputs of this process are:
    the availability flag availableFlagSbCol,
    the number of luma coding subblocks in horizontal direction numSbX and in vertical direction
    numSbY,
    the reference indices refIdxL0SbCol and refIdxL1SbCol,
    the luma motion vectors in 1/16 fractional-sample accuracy mvL0SbCol[ xSbIdx ][ ySbIdx ]
    and mvL1SbCol[ xSbIdx ][ ySbIdx ] with xSbIdx = 0..numSbX − 1, ySbIdx = 0 .. numSbY − 1,
    the prediction list utilization flags predFlagL0SbCol[ xSbIdx ][ ySbIdx ] and
    predFlagL1SbCol[ xSbIdx ][ ySbIdx ] with xSbIdx = 0..numSbX − 1,
    ySbIdx = 0 .. numSbY − 1.
The availability flag availableFlagSbCol is derived as follows.
    If one or more of the following conditions is true, availableFlagSbCol is set equal to 0.
        slice_temporal_mvp_enabled_flag is equal to 0.
        sps_sbtmvp_enabled_flag is equal to 0.
        cbWidth is less than 8.
        cbHeight is less than 8.
    Otherwise, the following ordered steps apply:
    1.  The location ( xCtb, yCtb ) of the top-left sample of the luma coding tree block that
        contains the current coding block and the location ( xCtr, yCtr ) of the below-right center
        sample of the current luma coding block are derived as follows:
            xCtb = ( xCb >> CtuLog2Size ) << CtuLog2Size    (8-514)
            yCtb = ( yCb >> CtuLog2Size ) << CtuLog2Size    (8-515)
            xCtr = xCb + ( cbWidth / 2 )    (8-516)
            yCtr = yCb + ( cbHeight / 2 )    (8-517)

TABLE 1-continued 1.1.1.1 Derivation process for subblock-based temporal merging candidates 2. The luma location ( xColCtrCb, yColCtrCb ) is set equal to the top-left sample of the collocated luma coding block covering the location given by ( xCtr, yCtr ) inside ColPic relative to the top-left luma sample of the collocated picture specified by ColPic.
3. The derivation process for subblock-based temporal merging base motion data as specified in clause 8.5.5.4 is invoked with the location ( xCtb, yCtb ), the location ( xColCtrCb, yColCtrCb ), the availability flag availableFlagA$_1$, and the prediction list utilization flag predFlagLXA$_1$, and the reference index refIdxLXA$_1$, and the motion vector mvLXA$_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
4. The variable availableFlagSbCol is derived as follows:
   If both ctrPredFlagL0 and ctrPredFlagL1 are equal to 0, availableFlagSbCol is set equal to 0.
   Otherwise, availableFlagSbCol is set equal to 1.

When availableFlagSbCol is equal to 1, the following applies:
The variables numSbX, numSbY, sbWidth, sbHeight and refIdxLXSbCol are derived as follows:

| | |
|---|---|
| numSbX = cbWidth >> 3 | (8-518) |
| numSbY = cbHeight >> 3 | (8-519) |
| sbWidth = cbWidth / numSbX | (8-520) |
| sbHeight = cbHeight / numSbY | (8-521) |
| refIdxLXSbCol = 0 | (8-522) |

For xSbIdx = 0..numSbX − 1 and ySbIdx = 0 .. numSbY − 1, the motion vectors mvLXSbCol[ xSbIdx ][ ySbIdx ] and prediction list utilization flags predFlagLXSbCol[ xSbIdx ][ ySbIdx ] are derived as follows:
The luma location ( xSb, ySb ) specifying the top-left sample of the current coding subblock relative to the top-left luma sample of the current picture is derived as follows:

| | |
|---|---|
| xSb = xCb + xSbIdx * sbWidth | (8-523) |
| ySb = yCb + ySbIdx * sbHeight | (8-524) |

The location ( xColSb, yColSb ) of the collocated subblock inside ColPic is derived as follows.

xColSb = Clip3( xCtb,
    Min( CurPicWidthInSamplesY − 1, xCtb + ( 1 << CtbLog2SizeY ) + 3 ),(8-525)
    xSb + ( tempMv[0] >> 4 ) )
yColSb = Clip3( yCtb.
    Min( CurPicHeightInSamplesY − 1, yCtb + ( 1 << CtbLog2SizeY ) − 1 ), (8-526)
    ySb + ( tempMv[1] >> 4 ) )

The variable currCb specifies the luma coding block covering the current coding subblock inside the current picture.
The variable colCb specifies the luma coding block covering the modified location given by ( ( xColSb >> 3 ) << 3, ( yColSb >> 3 ) << 3 ) inside the ColPic.
The luma location ( xColCb, yColCb ) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx ] and availableFlagL0SbCol.
The derivation process for collocated motion vectors as specified in clause 8.5.2.12 is invoked with currCb, colCb, ( xColCb, yColCb ), refIdxL1 set equal to 0 and sbFlag set equal to 1 as inputs and the output being assigned to the motion vector of the subblock mvL1SbCol[ xSbIdx ][ ySbIdx ] and availableFlagL1SbCol.
When availableFlagL0SbCol and availableFlagL1SbCol are both equal to 0, the following applies for X being 0 and 1:

| | |
|---|---|
| mvLXSbCol[ xSbIdx ][ ySbIdx ] = ctrMvLX | (8-527) |
| predFlagLXSbCol[ xSbIdx ][ ySbIdx ] = ctrPredFlagLX | (8-528) |

In deriving an sbTMVP candidate according to a method illustrated in Table 1, a default MV and a subblock MV(s) may be considered. In this case, the default MV may be called subblock-based temporal merging base motion data or a base motion vector (base motion information). Referring to Table 1, the default MV may correspond to ctrMV (or ctrMVLX) in Table 1. The subblock MV may correspond to mvSbCol (or mvLXSbcol) in Table 1.

For example, if a subblock or a subblock MV is available according to an sbTMVP derivation process, the subblock MV may be assigned to a corresponding subblock or if a subblock or a subblock MV is not available, the default MV may be used as a corresponding subblock MV with respect to a corresponding subblock. In this case, the default MV may derive motion information from a position corresponding to a center pixel position of a corresponding block (i.e., col CU) on a col picture, and each subblock MV may derive motion information from a top-left position of a corresponding subblock (i.e., the col subblock) on the col picture. In this case, the corresponding block (i.e., col CU) may be derived from a motion-shifted position based on a motion vector (i.e., temporal MV) of the spatial neighbor block A1 as described above in FIG. 11.

FIG. 11 is diagrams for schematically describing a method of calculating a corresponding position for deriving a default MV and a subblock MV based on a block size in an sbTMVP derivation process.

A pixel (sample) slashed by dotted lines in FIG. 11 indicates a corresponding position of each subblock for deriving each subblock MV, and a pixel (sample) slashed by solid lines illustrates a corresponding position of CU for deriving a default MV.

For example, referring to (a) of FIG. 11, if a current block (i.e., a current CU) has an 8×8 size, motion information of a subblock may be derived based on an top-left sample position within the subblock having the 8×8 size, and default motion information of the subblock may be derived based on a center sample position within a current block (i.e., the current CU) having the 8×8 size.

Alternatively, for example, referring to (b) of FIG. 11, if the current block (i.e., a current CU) has a 16×8 size, motion information of each subblock may be derived based on a top-left sample position within each subblock having an 8×8 size, and default motion information of each subblock may be derived based on a center sample position within a current block (i.e., the current CU) having the 16×8 size.

Alternatively, for example, referring to (c) of FIG. 11, if a current block (i.e., a current CU) has an 8×16 size, motion information of each subblock may be derived based on a top-left sample position within each subblock having an 8×8 size, and default motion information of each subblock may be derived based on a center sample position within a current block (i.e., the current CU) having an 8×16 size.

Alternatively, for example, referring to (d) of FIG. 11, if a current block (i.e., a current CU) has a 16×16 size, motion information of each subblock may be derived based on a top-left sample position within each subblock having an 8×8 size, and default motion information of each subblock may be derived based on a center sample position within a current block (i.e., the current CU) having a 16×16 size.

As may be seen from FIG. 11, since motion information of a subblock is inclined toward a top-left pixel position, there is a problem in that a subblock MV is derived at a position far from a position where a default MV indicative of representative motion information of a current CU is derived. As an example, in the case of the 8×8 block illustrated in (a) of FIG. 11, one CU includes one subblock, but there is a contradiction that the subblock MV and the default MV are represented as different motion information. Furthermore, since methods of calculating corresponding positions of a subblock and a current CU block are different (i.e., the corresponding position for driving an MV of the subblock is a top-left sample position and the corresponding position for deriving the default MV is a center sample position), an additional module may be necessary upon hardware (H/W) implementation.

Accordingly, in order to improve the problem, this document proposes a scheme for unifying a method of deriving a corresponding position of a CU for a default MV and a method of deriving a corresponding position of a subblock for each subblock MV in a process of deriving an sbTMVP candidate. According to an embodiment of this document, there is an unification effect in that only one module for deriving each corresponding position based on a block size can be used from a hardware (H/W) viewpoint. For example, since a method of calculating a corresponding position if a block size is a 16×16 block and a method of calculating a corresponding position if a block size is an 8×8 block can be identically implemented, there is a simplification effect from a hardware implementation aspect. In this case, the 16×16 block may represent a CU, and the 8×8 block may represent each subblock.

As an embodiment, in deriving an sbTMVP candidate, a center sample position may be used as a corresponding position for deriving motion information of a subblock and a corresponding position for deriving default motion information, and may be implemented as in Table 2 below.

Table 2 below is specification illustrating an example of a method of deriving motion information of a subblock and default motion information according to an embodiment of this document.

TABLE 2

1.1.1.2 Derivation process for subblock-based temporal merging candidates

Inputs to this process are:
    a luma location ( xCb, yCb ) of the top-left sample of the current luma coding block relative to the top-left luma sample of the current picture,
    a variable cbWidth specifying the width of the current coding block in luma samples,
    a variable cbHeight specifying the height of the current coding block in luma samples.
    the availability flag availableFlagA$_1$ of the neighbouring coding unit,
    the reference index refIdxLXA$_1$ of the neighbouring coding unit with X being 0 or 1,
    the prediction list utilization flag predFlagLXA$_1$ of the neighbouring coding unit with X being 0 or 1,
    the motion vector in 1/16 fractional-sample accuracy mvLXA$_1$ of the neighbouring coding unit with X being 0 or 1.
Outputs of this process are:
    the availability flag availableFlagSbCol,
    the number of luma coding subblocks in horizontal direction numSbX and in vertical direction numSbY,
    the reference indices refIdxL0SbCol and refIdxL1SbCol,
    the luma motion vectors in 1/16 fractional-sample accuracy mvL0SbCol[ xSbIdx ][ ySbIdx ] and mvL1SbCol[ xSbIdx ][ ySbIdx ] with xSbIdx = 0..numSbX − 1, ySbIdx = 0 .. numSbY − 1,
    the prediction list utilization flags predFlagL0SbCol[ xSbIdx ][ ySbIdx ] and predFlagL1SbCol[ xSbIdx ][ ySbIdx ] with xSbIdx = 0..numSbX − 1, ySbIdx = 0 .. numSbY − 1.
The availability flag availableFlagSbCol is derived as follows.
    If one or more of the following conditions is true, availableFlagSbCol is set equal to 0.
        slice_temporal_mvp_enabled_flag is equal to 0.
        sps_sbtmvp_enabled_flag is equal to 0.
        cbWidth is less than 8.
        cbHeight is less than 8.
    Otherwise, the following ordered steps apply:
    5.    The location ( xCtb, yCtb ) of the top-left sample of the luma coding tree block that contains the current coding block and the location ( xCtr, yCtr ) of the below-right center sample of the current luma coding block are derived as follows:
        xCtb = ( xCb >> CtuLog2Size ) << CtuLog2Size    (8-514)
        yCtb = ( yCb >> CtuLog2Size ) << CtuLog2Size    (8-515)
        xCtr = xCb + ( cbWidth / 2 )    (8-516)
        yCtr = yCb + ( cbHeight / 2 )    (8-517)

TABLE 2-continued 1.1.1.2 Derivation process for subblock-based temporal merging candidates 6. The luma location ( xColCtrCb, yColCtrCb ) is set equal to the top-left sample of the collocated luma coding block covering the location given by ( xCtr, yCtr ) inside ColPic relative to the top-left luma sample of the collocated picture specified by ColPic.
7. The derivation process for subblock-based temporal merging base motion data as specified in clause 8.5.5.4 is invoked with the location ( xCtb, yCtb ), the location ( xColCtrCb, yColCtrCb ), the availability flag availableFlag$A_1$, and the prediction list utilization flag predFlagLX$A_1$, and the reference index refIdxLX$A_1$, and the motion vector mvLX$A_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
8. The variable availableFlagSbCol is derived as follows:
   If both ctrPredFlagL0 and ctrPredFlagL1 are equal to 0, availableFlagSbCol is set equal to 0.
   Otherwise, availableFlagSbCol is set equal to 1.

When availableFlagSbCol is equal to 1, the following applies:
The variables numSbX, numSbY, sbWidth, sbHeight and refIdxLXSbCol are derived as follows:

numSbX = cbWidth >> 3   (8-518)
numSbY = cbHeight >> 3   (8-519)
sbWidth = cbWidth / numSbX   (8-520)
sbHeight = cbHeight / numSbY   (8-521)
refIdxLXSbCol = 0   (8-522)

For xSbIdx = 0..numSbX − 1 and ySbIdx = 0 .. numSbY − 1, the motion vectors mvLXSbCol[ xSbIdx ][ ySbIdx ] and prediction list utilization flags predFlagLXSbCol[ xSbIdx ][ ySbIdx ] are derived as follows:
The luma location ( xSb, ySb ) specifying the top-left sample of the current coding subblock relative to the top-left luma sample of the current picture is derived as follows:

xSb = xCb + xSbIdx * sbWidth + (sbWidth >> 1)   (8-523)
ySb = yCb + ySbIdx * sbHeight + (sbHeight >>1)   (8-524)

The location ( xColSb, yColSb ) of the collocated subblock inside ColPic is derived as follows.

xColSb = Clip3( xCtb,
    Min( CurPicWidthInSamplesY − 1, xCtb + ( 1 << CtbLog2SizeY ) + 3 ),(8-525)
    xSb + ( tempMv[0] >> 4 ) )
yColSb = Clip3( yCtb,
    Min( CurPicHeightInSamplesY − 1, yCtb + ( 1 << CtbLog2SizeY ) − 1 ), (8-526)
    ySb + ( tempMv[1] >> 4 ) )

The variable currCb specifies the luma coding block covering the current coding subblock inside the current picture.
The variable colCb specifies the luma coding block covering the modified location given by ( ( xColSb >> 3 ) << 3, ( yColSb >> 3 ) << 3 ) inside the ColPic.
The luma location ( xColCb, yColCb ) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx ] and availableFlagL0SbCol.
The derivation process for collocated motion vectors as specified in clause 8.5.2.12 is invoked with currCb, colCb, ( xColCb, yColCb ), refIdxL1 set equal to 0 and sbFlag set equal to 1 as inputs and the output being assigned to the motion vector of the subblock mvL1SbCol[ xSbIdx ][ ySbIdx ] and availableFlagL1SbCol.
When availableFlagL0SbCol and availableFlagL1SbCol are both equal to 0, the following applies for X being 0 and 1:

mvLXSbCol[ xSbIdx ][ ySbIdx ] = ctrMvLX   (8-527)
predFlagLXSbCol[ xSbIdx ][ ySbIdx ] = ctrPredFlagLX   (8-528)

Referring to Table 2, in deriving an sbTMVP candidate, a position of a current block (i.e., a current CU) including subblocks may be derived. A top-left sample position (xCtb, yCtb) of a coding tree block (or a coding tree unit) including a current block and a below-right center sample position (xCtr, yCtr) of the current block may be derived as in Equations (8-514)~(8-517) in Table 2. In this case, the positions (xCtb, yCtb) and (xCtr, yCtr) may be calculated based on a top-left sample position (xCb, yCb) of the current block with respect to a top-left sample of a current picture.

Furthermore, a col block (i.e., col CU) on a col picture positioned corresponding to the current block (i.e., the current CU) including the subblocks may be derived. In this case, the position of the col block may be set to (xColCtrCb, yColCtrCb). The position may represent the position of a col block including the position (xCtr, yCtr) within the col picture with respect to the top-left sample of the col picture.

Furthermore, base motion data (i.e., default motion information) for an sbTMVP may be derived. The base motion data may include a default MV (e.g., ctrMvLX). For example, a col block on the col picture may be derived. In this case, the position of the col block may be derived as (xColCb, yColCb). The position may be a position where a motion shift (e.g., tempMv) has been applied to the derived col block position (xColCtrCb, yColCtrCb). The motion shift, as described above, may be performed by adding, to the current col block position (xColCtrCb, yColCtrCb), a motion vector (e.g., tempMv) derived from the spatial neighbor block (e.g., A1 block) of the current block. Next, the default MV (e.g., ctrMvLX) may be derived based on the position (xColCb, yColCb) of the motion-shifted col block. In this case, the default MV (e.g., ctrMvLX) may represent a motion vector derived from a position corresponding to the below-right center sample of the col block.

Furthermore, col subblocks on a col picture corresponding to subblocks (denoted as current subblocks) in a current block may be derived. First, the position of each of the current subblocks may be derived. The position of each of the subblocks may be represented as (xSb, ySb). The position (xSb, ySb) may represent the position of the current subblock based on a top-left sample of a current picture. For example, the position (xSb, ySb) of the current subblock may be calculated as in Equations (8-523)~(8-524) in Table 2, which may represent a below-right center sample position of the subblock. Next, the position of each of col subblocks on the col picture may be derived. The position of each col subblock may be represented as (xColSb, yColSb). The position (xColSb, yColSb) may be a position where a motion shift (e.g., tempMv) has been applied to the position (xSb, ySb) of the current subblock. The motion shift, as described above, may be performed by adding, to the position (xSb, ySb) of the current subblock, a motion vector (e.g., tempMv) derived from a spatial neighbor block (e.g., A1 block) of the current block. Next, motion information (e.g., a motion vector mvLXSbCol, flag availableFlagLXSbCol indicating availability) of a col subblock may be derived based on the position (xColSb, yColSb) of each of the motion-shifted col subblocks.

In this case, if a col subblock that is not available among the col subblocks (e.g., when availableFlagLXSbCol is 0), base motion data (i.e., default motion information) may be used for the unavailable col subblock. For example, the default MV (e.g., ctrMvLX) may be used as the motion vector (e.g., mvLXSbCol) for the unavailable col subblock.

FIG. 12 is exemplary diagrams for schematically describing a method of unifying a corresponding position for deriving a default MV and a subblock MV based on a block size in an sbTMVP derivation process.

A pixel (sample) slashed by dotted lines in FIG. 12 indicates a corresponding position within each subblock for deriving each subblock MV, and a pixel (sample) slashed by solid lines therein illustrates a corresponding position a CU for deriving a default MV.

Figure 16:
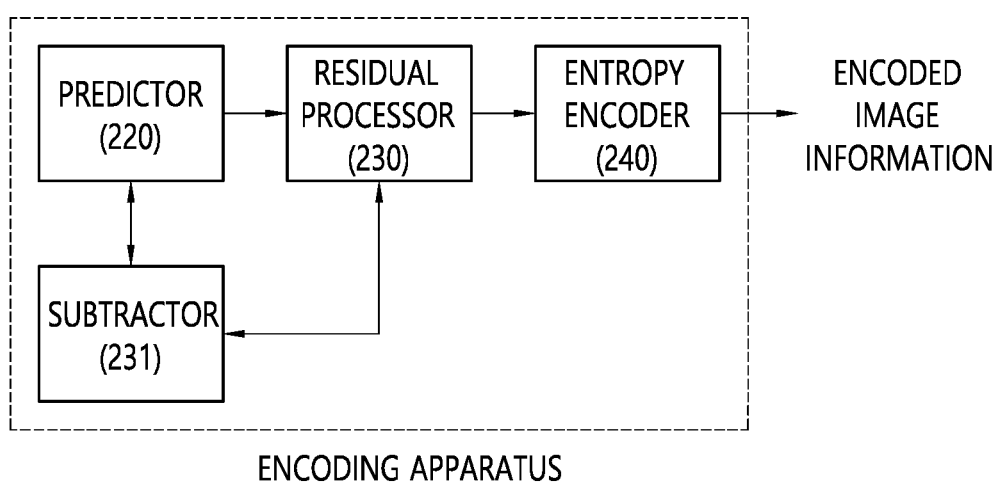

For example, referring to (a) of FIG. 12, if a current block (i.e., a current CU) has an 8×8 size, motion information may be derived from a col subblock of a corresponding position on a col picture based on a below-right center sample position within a subblock having the 8×8 size, and may be used as motion information of a current subblock. Motion information may be derived from a col block (i.e., col CU) of a corresponding position on the col picture based on a below-right center sample position within a current block (i.e., the current CU) having an 8×8 size, and may be used as default motion information of the current subblock. In this case, as illustrated in FIG. 16, the motion information and the default motion information of the current subblock may be derived from the same sample position (the same corresponding position).

Alternatively, for example, referring to (b) of FIG. 12, if a current block (i.e., a current CU) has an 16×8 size, motion information may be derived from a col subblock of a corresponding position on a col picture based on a below-right center sample position within a subblock having an 8×8 size, and may be used as motion information of a current subblock. Motion information may be derived from a col block (i.e., col CU) of a corresponding position on a col picture based on a below-right center sample position within a current block (i.e., a current CU) having an 16×8 size, and may be used as default motion information of the current subblock.

Alternatively, for example, referring to (c) of FIG. 12, if a current block (i.e., a current CU) has an 8×16 size, motion information may be derived from a col subblock of a corresponding position on a col picture based on a below-right center sample position within a subblock having the 8×8 size, and may be used as motion information of a current subblock. Motion information may be derived from a col block (i.e., col CU) of a corresponding position on a col picture based on a below-right center sample position within a current block (i.e., a current CU) having an 8×16 size, and may be used as default motion information of the current subblock.

Alternatively, for example, referring to (d) of FIG. 12, if a current block (i.e., a current CU) has a size equal to or larger than an 16×16 size, motion information may be derived from a col subblock of a corresponding position on a col picture based on a below-right center sample position within a subblock having an 8×8 size, and may be used as motion information of a current subblock. Motion information may be derived from a col block (i.e., col CU) of a corresponding position on a col picture based on a below-right center sample position within a current block (i.e., a current CU) having a 16×16 size (or 16×16 size or more), and may be used as default motion information of the current subblock.

However, the aforementioned embodiments of this document are merely examples, and the default motion information and the motion information of a current subblock may be derived based on another sample position in addition to the center position (i.e., the below-right sample position). For example, the default motion information may be derived based on a top-left sample position of a current CU, and the motion information of a current subblock may be derived based on a top-left sample position of a subblock.

If the embodiment of this document is implemented as hardware, a pipeline such as FIGS. 20 and 21 can be configured because motion information (temporal motion) can be derived using the same H/W module.

Figure 13:
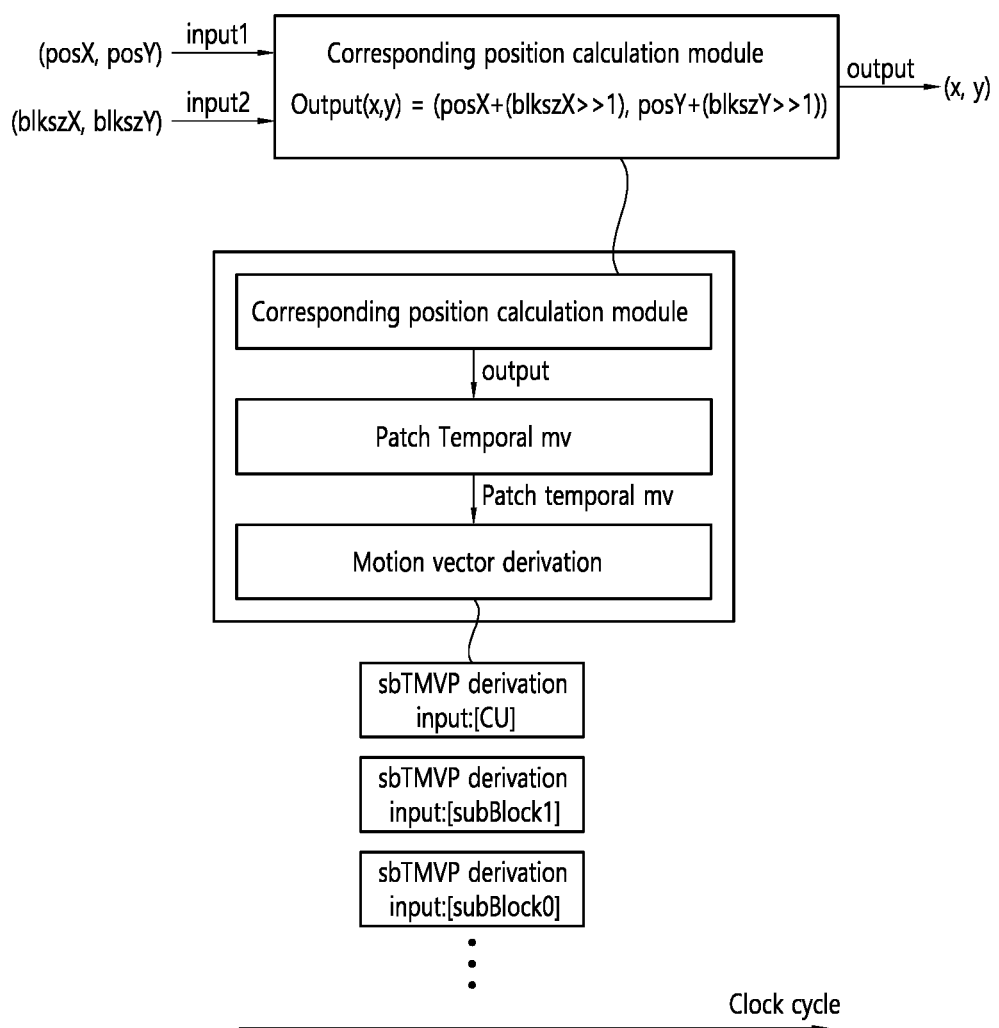
FIG. 13 and FIG. 14 are exemplary views schematically illustrating a configuration of a pipeline for calculating corresponding positions for inducing a default MV and a subblock MV according to block size in the sbTMVP derivation process.
Figure 14:
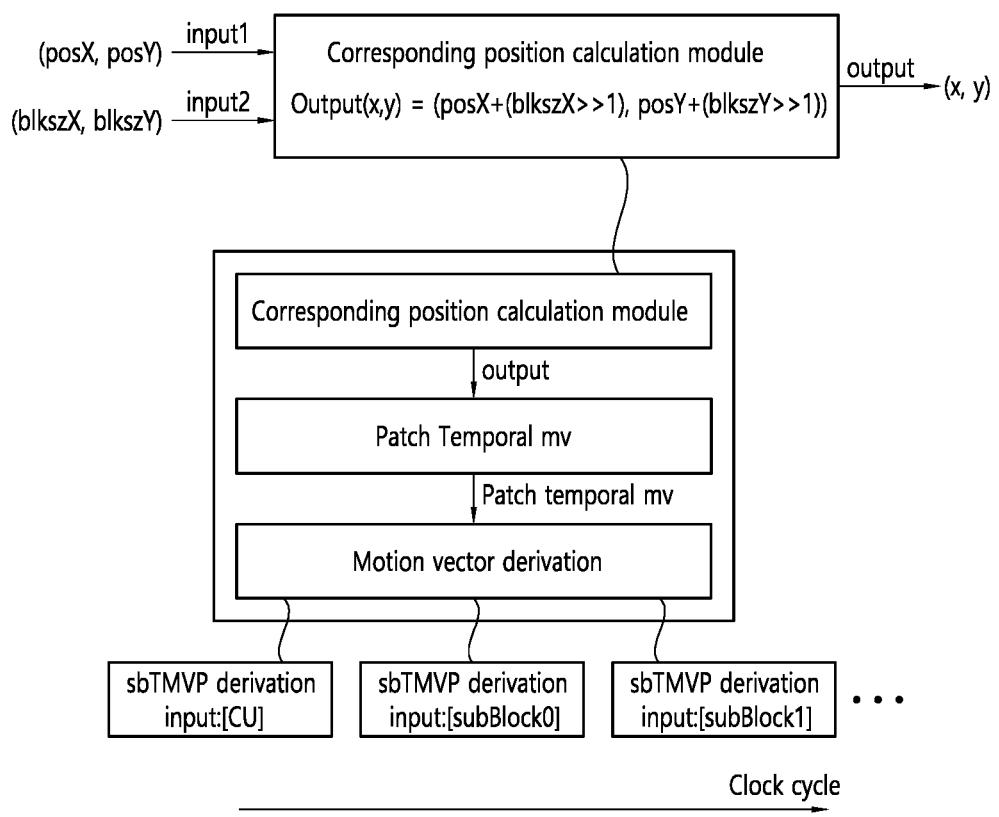

FIGS. 13 and 14 are exemplary diagrams schematically illustrating a configuration of a pipeline through which a corresponding position for deriving a default MV and a subblock MV can be unified and calculated in an sbTMVP derivation process.

Referring to FIGS. 13 and 14, a corresponding position calculation module may calculate a corresponding position for deriving a default MV and a subblock MV. For example, as illustrated in FIGS. 13 and 14, when a position (posX, posY) and block size (blkszX, blkszY) of a block are inputted to the corresponding position calculation module, a center position (i.e., a below-right sample position) of the inputted block may be outputted. When a position and block size of a current CU are inputted to the corresponding position calculation module, a center position (i.e., a below-right sample position) of a col block on a col picture, that is, a corresponding position for deriving a default MV, may be outputted. Alternatively, when a position and block size of a current subblock are inputted to the corresponding position calculation module, a center position (i.e., a below-right sample position) of a col subblock on a col picture, that is, a corresponding position for deriving a current subblock MV, may be outputted.

As described above, when a corresponding position for deriving a default MV and a subblock MV is outputted from the corresponding position calculation module, a motion vector (i.e., a temporal mv) derived from the corresponding position may be patched. Furthermore, subblock-based temporal motion information (i.e., sbTMVP candidate) may be derived based on the patched motion vector (i.e., the temporal mv). For example, as in FIGS. 13 and 14, sbTMVP candidates may be derived in parallel based on a clock cycle or sbTMVP candidates may be sequentially derived, depending on an H/W implementation.

The following drawings were written in order to describe a detailed example of this document. The names of detailed apparatuses written in the drawings or detailed terms or names (e.g., the name of a syntax/syntax name) are illustrative, and thus a technical characteristic of this document is not limited to the detailed names used in the following drawings.

Figure 15:
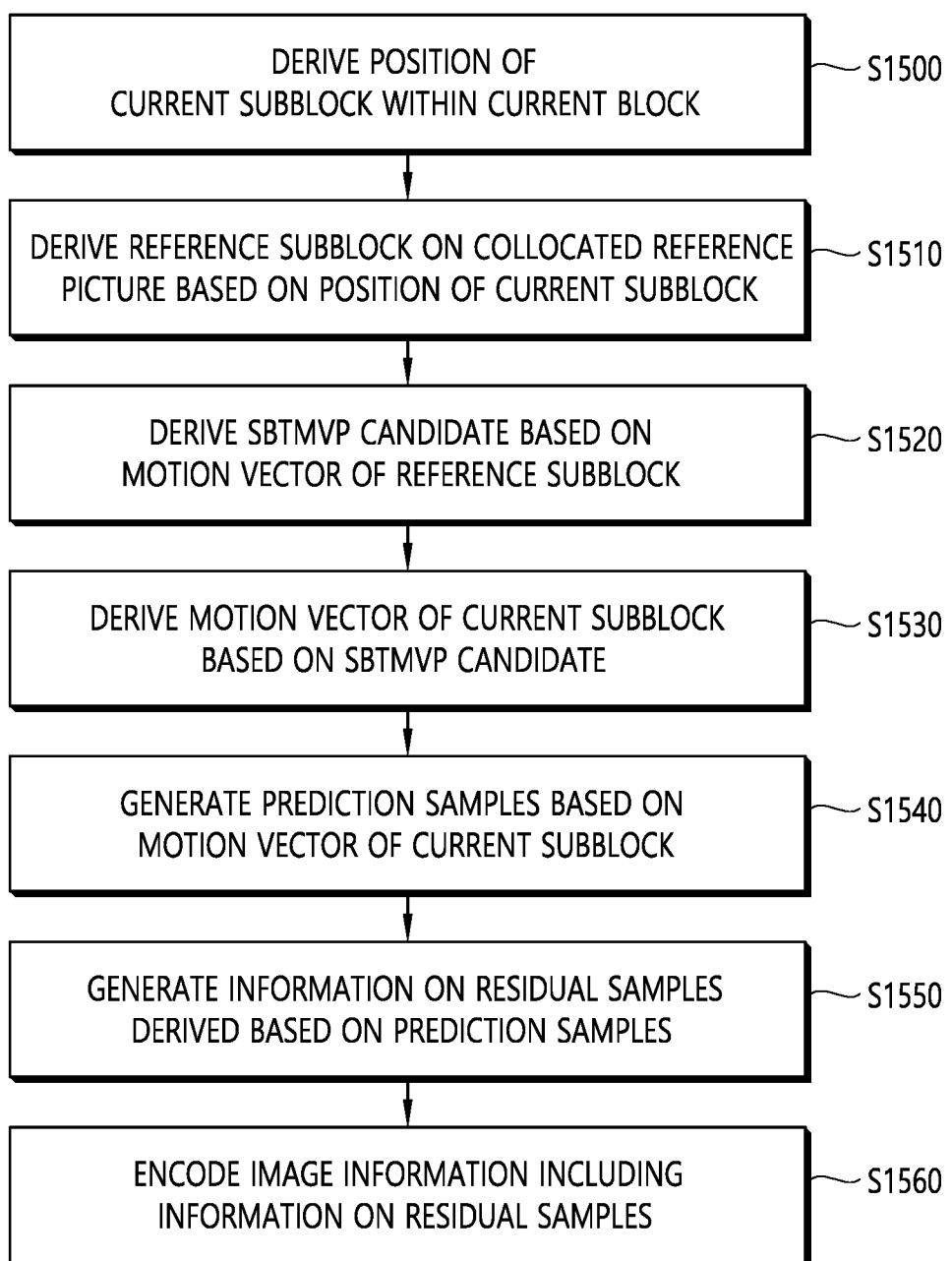
FIGS. 15 and 16 schematically show an example of a video/image encoding method and related components according to an embodiment(s) of the present disclosure.

FIGS. 15 and 16 schematically show an example of a video/image encoding method and related components according to an embodiment(s) of the present disclosure.

The method disclosed in FIG. 15 may be performed by the encoding apparatus 200 disclosed in FIG. 2. Specifically, steps S1500 to S1540 of FIG. 15 may be performed by the predictor 220 (more specifically, inter predictor 221) disclosed in FIG. 2, step S1550 of FIG. 15 may be performed by the residual processor 230 disclosed in FIG. 2, and step S1560 of FIG. 15 may be performed by the entropy encoder 240 disclosed in FIG. 2. Further, the method disclosed in FIG. 15 may include the embodiments described above in the present disclosure. Accordingly, in FIG. 15, detailed descriptions of any redundancies with the embodiments will be omitted or made briefly.

Referring to FIG. 15, the encoding apparatus may derive positions of subblocks included in a current block (S1500).

Here, the current block may be referred to as a current coding unit CU or a current coding block CB, and the subblocks included in the current block may be referred to as current coding subblocks.

In an embodiment, the encoding apparatus may derive a position of a current subblock in the current block.

For example, the encoding apparatus may derive the position of the current subblock on the current picture based on a center sample position of the current subblock. In this case, the center sample position may represent the position of a right-lower center sample positioned at the bottom right, among four samples positioned at the center.

Meanwhile, a left-upper sample position used in this disclosure may be referred to as a top-left sample position or an upper-left sample position, etc. and a right-lower center sample position may be referred to as a below-right center sample position, a center right-lower sample position, a bottom-right center sample position, or a center bottom-right sample position, etc.

The encoding apparatus may derive reference subblocks on a collocated reference picture for the subblocks within the current block (S1510).

Here, the collocated reference picture refers to a reference picture used to derive temporal motion information (i.e., sbTMVP) as described above, and may represent the above-described col picture. The reference subblocks may represent the above-described col subblocks.

In an embodiment, the encoding apparatus may derive a reference subblock on a collocated reference picture based on the position of the current subblock within the current block. For example, the encoding apparatus may derive a reference subblock on a collocated reference picture based on a center sample position (e.g., right-lower center sample position) of the current subblock.

For example, the encoding apparatus may specify the position of the current block first and then specify the positions of subblocks within the current block. As explained with reference to the above Table 2, the position of the current block may be represented based on a top-left sample position (XCtb, yCtb) of a coding tree block and a right-lower center sample position (xCtr, yCtr) of the current block. The position of a current subblock within the current block may be represented as (xSb, ySb), and this position (xSb, ySb) may represent the right-lower center sample position of the current subblock. Here, the right-lower center sample position (xSb, ySb) of the subblock may be calculated based on the top-left sample position and subblock size of the subblock, and may be calculated as in Equations 8-523 and 8-524 of the above Table 2.

Also, the encoding apparatus may derive the reference subblock on the collocated reference picture based on the right-lower center sample position of the current subblock within the current block. As explained with reference to the above Table 2, the reference subblock may be represented as the position (xColSb, yColSb) on the collocated reference picture, and the position (xColSb, yColSb) may be derived on the collocated reference picture based on the right-lower center sample position (xSb, ySb) of the current subblock within the current block.

Moreover, a motion shift may be applied in deriving the reference subblocks. The encoding apparatus may perform a motion shift based on a motion vector derived from a spatial neighboring block of the current block. The spatial neighboring block of the current block may be a left neighboring block positioned on the left side of the current block—for example, the A1 block depicted in FIGS. 9 and 10. In this case, if the left neighboring block (e.g., A1 block) is available, a motion vector may be derived from the left neighboring block, or if the left neighboring block is not available, a zero vector may be derived. Here, the availability of a spatial neighboring block may be determined by reference picture information, prediction mode information, position information, etc. of the spatial neighboring block. For example, if a reference picture of the spatial neighboring block and a reference picture of the current block are the same, this spatial neighboring block may be determined to be available. Alternatively, if the spatial neighboring block is coded in an intra prediction mode or the spatial neighboring block is positioned outside the current picture/tile, this spatial neighboring block may be determined to be unavailable.

That is, the encoding apparatus may apply a motion shift (i.e., a motion vector of the spatial neighboring block (e.g., A1 block)) to the right-lower center sample position (xSb, ySb) of the current subblock within the current block, and may derive the reference subblock on the collocated reference picture based on the motion-shifted position. In this case, the position (xColSb, yColSb) of the reference subblock may be represented as a position that is obtained by motion-shifting from the right-lower center sample position (xSb, ySb) of the current subblock within the current block to a position indicated by the motion vector of the spatial neighboring block (e.g., A1 block), and may be calculated as in Equations 8-525 and 8-526 of the above Table 2.

The encoding apparatus may derive an sbTMVP (subblock temporal motion vector predictor) candidate based on the reference subblocks (S1520).

Meanwhile, in this disclosure, the sbTMVP candidate may be replaced or used interchangeably with a subblock-based temporal motion information candidate or subblock unit temporal motion information candidate, a subblock-based temporal motion vector predictor candidate, etc. That is, if motion information is derived for each subblock to perform prediction as described above, an sbTMVP candidate may be derived, and motion prediction may be performed at the subblock level (or sub coding unit (sub-CU) level) based on the sbTMVP candidate.

In an embodiment, the encoding apparatus may derive an sbTMVP candidate based on a motion vector of a reference subblock. For example, the encoding apparatus may derive the sbTMVP candidate based on the motion vector of the reference subblock derived based on whether the reference subblock is available. If the reference subblock is available, the motion vector of the available reference subblock may be derived as the sbTMVP candidate. If the reference subblock is not available, a base motion vector may be derived as the sbTMVP candidate.

Here, the base motion vector may correspond to the above-described default motion vector, and may be derived on a collocated reference picture based on the position of the current block. In this case, the position of the current block may be derived based on a center sample position (e.g., right-lower center sample position) within the current block.

In deriving a base motion vector, in an embodiment, the encoding apparatus may specify the position of a reference coding block on the collocated reference picture based on the right-lower center sample position of the current block and derive the base motion vector based on the position of the reference coding block. The reference coding block may refer to a col block positioned on the collocated reference picture corresponding to the current block including subblocks. As explained with reference to the above Table 2, the position of the reference coding block may be represented as (xColCtrCb, yColCtrCb), and the position (xColCtrCb, yColCtrCb) may represent the position of the reference coding block covering the position ((xCtr, yCtr) within the collocated reference picture with respect to a top-left sample of the collocated reference picture. The position (xCtr, yCtr) may represent the right-lower center sample position of the current block.

Moreover, in deriving a base motion vector, a motion shift may be applied to the position (xColCtrCb, yColCtrCb) of the reference coding block. The motion shift may be performed by adding a motion vector derived from a spatial neighboring block (e.g., A1 block) of the current block as described above to the position (xColCtrCb, yColCtrCb) of the reference coding block covering the right-lower center sample. The encoding apparatus may derive a base motion vector based on the position (xColCb, yColCb) of the motion-shifted reference coding block. That is, the base motion vector may be a motion vector that is derived from a motion-shifted position on the collocated reference picture based on the right-lower center sample position of the current block.

Meanwhile, the availability of the reference subblock may be determined based on whether it is positioned outside the collocated reference picture or not or based on a motion vector. For example, the unavailable reference subblock may include a reference subblock positioned outside the collocated reference picture or a reference subblock whose motion vector is not available. For example, if the reference subblock is based on an intra mode, an IBC (intra block copy) mode, or a palette mode, the reference subblock may be a subblock whose motion vector is not available. Alternatively, if a reference coding block covering a modified location derived based on the position of the reference subblock is based on an intra mode, an IBC mode, or a palette mode, the reference subblock may be a subblock whose motion vector is not available.

In this case, as an embodiment, the motion vector of the available reference subblock may be derived based on a motion vector of a block covering a modified location derived based on a top-left sample position of the reference subblock. For example, as shown in the above Table 2, the modified location may be derived by an equation ((xColSb>>3)<<3, (yColSb>>3)<<3). Here, xColSb and yColSb may represent the x coordinate and y coordinate of the top-left sample position of the reference subblock, respectively, and >> may represent an arithmetic right shift, and << may represent an arithmetic left shift.

Meanwhile, as described above, in deriving an sbTMVP candidate, it can be seen that motion vectors for reference subblocks are derived based on the positions of subblocks within the current block, and a base motion vector is derived based on the position of the current block. For example, as explained in FIG. 12, for a current block with a size of 8×8, a motion vector and base motion vector for a reference subblock may be derived based on the right-lower center sample position of the current block. For a current block with a size larger than 8×8, a motion vector for a reference subblock may be derived based on the right-lower center sample position of the subblock within the current block, and a base motion vector may be derived based on the right-lower center sample position of the current block.

The encoding apparatus may derive motion information for the subblocks within the current block based on the sbTMVP candidate (S1530).

In an embodiment, the encoding apparatus may derive the motion vector of the reference subblock as motion information (e.g., a motion vector) of the current subblock within the current block. As described above, the encoding apparatus may derive an sbTMVP candidate based on a motion vector of an available reference subblock or base motion vector, and the motion vector derived as the sbTMVP candidate may be used as a motion vector for the current subblock.

The encoding apparatus may generate prediction samples of the current block based on the motion information for the subblocks within the current block (S1540).

In an embodiment, the encoding apparatus may generate prediction samples based on the motion vector of the current subblock. Specifically, the encoding apparatus may select optimum motion information based on RD (rate-distortion) cost and generate prediction samples based on this information. For example, if motion information (i.e., sbTMVP) derived for each subblock of the current block is selected as optimum motion information, the encoding apparatus may generate prediction samples of the current block based on the above derived motion information for the subblocks of the current block.

The encoding apparatus may generate information on residual samples derived based on the prediction samples (S1550), and may encode image information including the information on the residual samples (S1560).

That is, the encoding apparatus may derive residual samples based on the original samples of the current block and the prediction samples of the current block. Also, the encoding apparatus may generate information on the residual samples. Here, the information on the residual samples may include information, such as value information, position information, transform scheme, transform kernel, and quantization parameter of the quantized transform coefficients, that is derived by performing transform and quantization on the residual samples.

The encoding apparatus may encode the information on the residual samples and output it as a bitstream, and may transmit it to a decoding apparatus through a network or storage medium.

Figure 17:
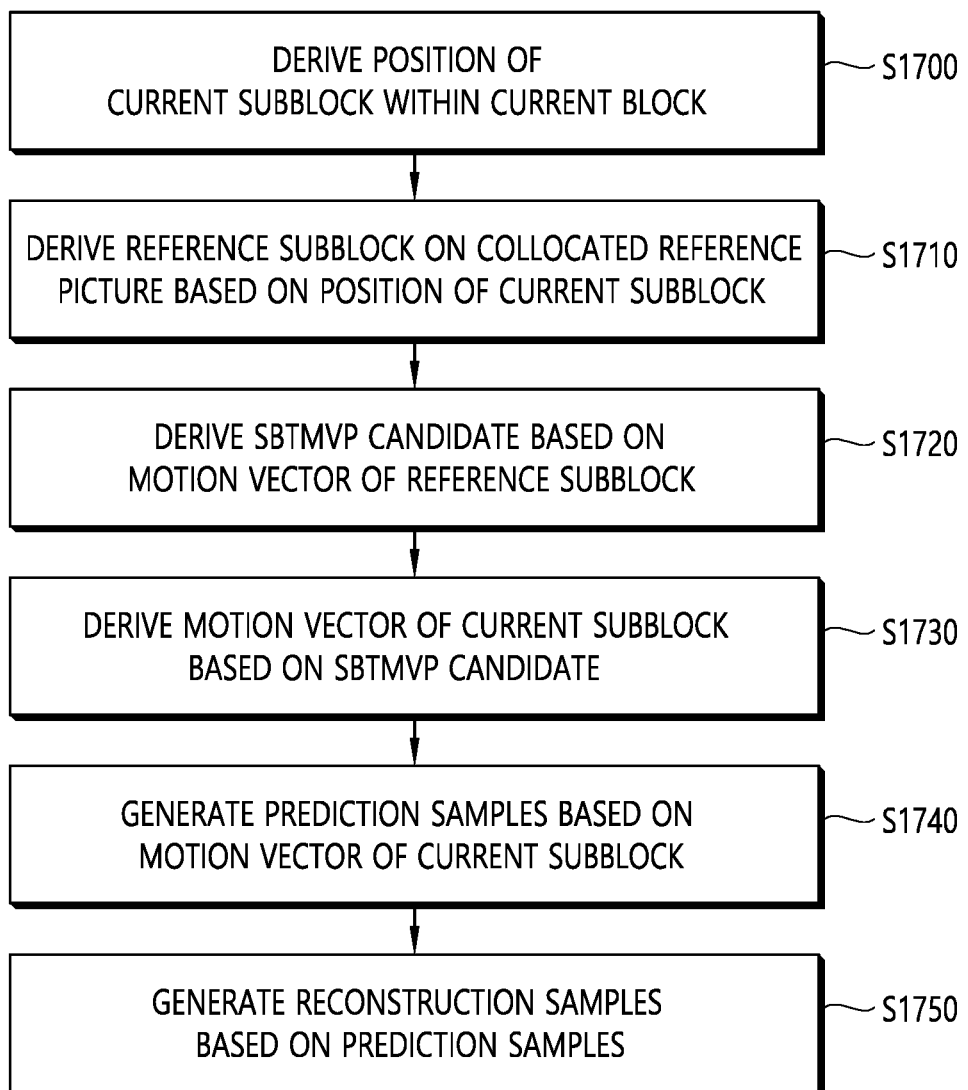
FIGS. 17 and 18 schematically show an example of a video/image decoding method and related components according to an embodiment(s) of the present disclosure.
Figure 18:
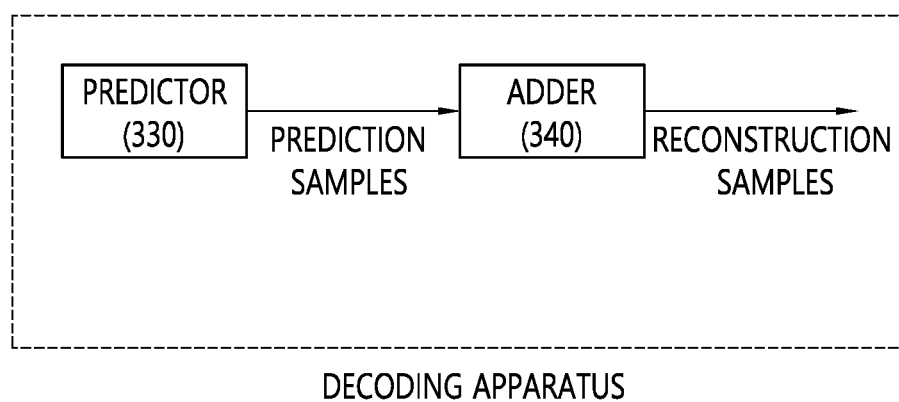

FIGS. 17 and 18 schematically show an example of a video/image decoding method and related components according to an embodiment(s) of the present disclosure.

The method disclosed in FIG. 17 may be performed by the decoding apparatus 300 disclosed in FIG. 3. Specifically, steps S1700 to S1740 of FIG. 17 may be performed by the predictor 330 (more specifically, inter predictor 332) disclosed in FIG. 3, and step S1750 of FIG. 17 may be performed by the adder 340 disclosed in FIG. 3. Further, the method disclosed in FIG. 17 may include the embodiments described above in the present disclosure. Accordingly, in FIG. 17, detailed descriptions of any redundancies with the embodiments will be omitted or made briefly.

Referring to FIG. 17, the decoding apparatus may derive positions of subblocks included in a current block (S1700).

Here, the current block may be referred to as a current coding unit CU or a current coding block CB, and the subblocks included in the current block may be referred to as current coding subblocks.

In an embodiment, the decoding apparatus may derive a position of a current subblock in the current block.

For example, the decoding apparatus may derive the position of the current subblock on the current picture based on a center sample position of the current subblock. In this case, the center sample position may represent the position of a right-lower center sample positioned at the bottom right, among four samples positioned at the center.

Meanwhile, a left-upper sample position used in this disclosure may be referred to as a top-left sample position or an upper-left sample position, etc. and a right-lower center sample position may be referred to as a below-right center sample position, a center right-lower sample position, a bottom-right center sample position, or a center bottom-right sample position, etc.

The decoding apparatus may derive reference subblocks on a collocated reference picture for the subblocks within the current block (S1710).

Here, the collocated reference picture refers to a reference picture used to derive temporal motion information (i.e., sbTMVP) as described above, and may represent the above-described col picture. The reference subblocks may represent the above-described col subblocks.

In an embodiment, the decoding apparatus may derive a reference subblock on a collocated reference picture based on the position of the current subblock within the current block. For example, the decoding apparatus may derive a reference subblock on a collocated reference picture based on a center sample position (e.g., right-lower center sample position) of the current subblock.

For example, the decoding apparatus may specify the position of the current block first and then specify the positions of subblocks within the current block. As explained with reference to the above Table 2, the position of the current block may be represented based on a top-left sample position (XCtb, yCtb) of a coding tree block and a right-lower center sample position (xCtr, yCtr) of the current block. The position of a current subblock within the current block may be represented as (xSb, ySb), and this position (xSb, ySb) may represent the right-lower center sample position of the current subblock. Here, the right-lower center sample position (xSb, ySb) of the subblock may be calculated based on the top-left sample position and subblock size of the subblock, and may be calculated as in Equations 8-523 and 8-524 of the above Table 2.

Also, the decoding apparatus may derive the reference subblock on the collocated reference picture based on the right-lower center sample position of the current subblock within the current block. As explained with reference to the above Table 2, the reference subblock may be represented as the position (xColSb, yColSb) on the collocated reference picture, and the position (xColSb, yColSb) may be derived on the collocated reference picture based on the right-lower center sample position (xSb, ySb) of the current subblock within the current block.

Moreover, a motion shift may be applied in deriving the reference subblocks. The decoding apparatus may perform a motion shift based on a motion vector derived from a spatial neighboring block of the current block. The spatial neighboring block of the current block may be a left neighboring block positioned on the left side of the current block—for example, the A1 block depicted in FIGS. 9 and 10. In this case, if the left neighboring block (e.g., A1 block) is available, a motion vector may be derived from the left neighboring block, or if the left neighboring block is not available, a zero vector may be derived. Here, the availability of a spatial neighboring block may be determined by reference picture information, prediction mode information, position information, etc. of the spatial neighboring block. For example, if a reference picture of the spatial neighboring block and a reference picture of the current block are the same, this spatial neighboring block may be determined to be available. Alternatively, if the spatial neighboring block is coded in an intra prediction mode or the spatial neighboring block is positioned outside the current picture/tile, this spatial neighboring block may be determined to be unavailable.

That is, the decoding apparatus may apply a motion shift (i.e., a motion vector of the spatial neighboring block (e.g., A1 block)) to the right-lower center sample position (xSb, ySb) of the current subblock within the current block, and may derive the reference subblock on the collocated reference picture based on the motion-shifted position. In this case, the position (xColSb, yColSb) of the reference subblock may be represented as a position that is obtained by motion-shifting from the right-lower center sample position (xSb, ySb) of the current subblock within the current block to a position indicated by the motion vector of the spatial neighboring block (e.g., A1 block), and may be calculated as in Equations 8-525 and 8-526 of the above Table 2.

The decoding apparatus may derive an sbTMVP (subblock temporal motion vector predictor) candidate based on the reference subblocks (S1720).

Meanwhile, in this disclosure, the sbTMVP candidate may be replaced or used interchangeably with a subblock-based temporal motion information candidate or subblock unit temporal motion information candidate, a subblock-based temporal motion vector predictor candidate, etc. That is, if motion information is derived for each subblock to perform prediction as described above, an sbTMVP candidate may be derived, and motion prediction may be performed at the subblock level (or sub coding unit (sub-CU) level) based on the sbTMVP candidate.

In an embodiment, the decoding apparatus may derive an sbTMVP candidate based on a motion vector of a reference subblock. For example, the decoding apparatus may derive the sbTMVP candidate based on the motion vector of the reference subblock derived based on whether the reference subblock is available. If the reference subblock is available, the motion vector of the available reference subblock may be derived as the sbTMVP candidate. If the reference subblock is not available, a base motion vector may be derived as the sbTMVP candidate.

Here, the base motion vector may correspond to the above-described default motion vector, and may be derived on a collocated reference picture based on the position of the current block. In this case, the position of the current block may be derived based on a center sample position (e.g., right-lower center sample position) within the current block.

In deriving a base motion vector, in an embodiment, the decoding apparatus may specify the position of a reference coding block on the collocated reference picture based on the right-lower center sample position of the current block and derive the base motion vector based on the position of the reference coding block. The reference coding block may refer to a col block positioned on the collocated reference picture corresponding to the current block including subblocks. As explained with reference to the above Table 2, the position of the reference coding block may be represented as (xColCtrCb, yColCtrCb), and the position (xColCtrCb, yColCtrCb) may represent the position of the reference coding block covering the position (xCtr, yCtr) within the collocated reference picture with respect to a top-left sample of the collocated reference picture. The position (xCtr, yCtr) may represent the right-lower center sample position of the current block.

Moreover, in deriving a base motion vector, a motion shift may be applied to the position (xColCtrCb, yColCtrCb) of the reference coding block. The motion shift may be performed by adding a motion vector derived from a spatial neighboring block (e.g., A1 block) of the current block as described above to the position (xColCtrCb, yColCtrCb) of the reference coding block covering the right-lower center sample. The decoding apparatus may derive a base motion vector based on the position (xColCb, yColCb) of the motion-shifted reference coding block. That is, the base motion vector may be a motion vector that is derived from a motion-shifted position on the collocated reference picture based on the right-lower center sample position of the current block.

Meanwhile, the availability of the reference subblock may be determined based on whether it is positioned outside the collocated reference picture or not or based on a motion vector. For example, the unavailable reference subblock may include a reference subblock positioned outside the collocated reference picture or a reference subblock whose motion vector is not available. For example, if the reference subblock is based on an intra mode, an IBC (intra block copy) mode, or a palette mode, the reference subblock may be a subblock whose motion vector is not available. Alternatively, if a reference coding block covering a modified location derived based on the position of the reference subblock is based on an intra mode, an IBC mode, or a palette mode, the reference subblock may be a subblock whose motion vector is not available.

In this case, as an embodiment, the motion vector of the available reference subblock may be derived based on a motion vector of a block covering a modified location derived based on a top-left sample position of the reference subblock. For example, as shown in the above Table 2, the modified location may be derived by an equation ((xColSb>>3)<<3, (yColSb>>3)<<3). Here, xColSb and yColSb may represent the x coordinate and y coordinate of the top-left sample position of the reference subblock, respectively, and >> may represent an arithmetic right shift, and << may represent an arithmetic left shift.

Meanwhile, as described above, in deriving an sbTMVP candidate, it can be seen that motion vectors for reference subblocks are derived based on the positions of subblocks within the current block, and a base motion vector is derived based on the position of the current block. For example, as explained in FIG. 12, for a current block with a size of 8×8, a motion vector and base motion vector for a reference subblock may be derived based on the right-lower center sample position of the current block. For a current block with a size larger than 8×8, a motion vector for a reference subblock may be derived based on the right-lower center sample position of the subblock within the current block, and a base motion vector may be derived based on the right-lower center sample position of the current block.

The decoding apparatus may derive motion information for the subblocks within the current block based on the sbTMVP candidate (S1730).

In an embodiment, the decoding apparatus may derive the motion vector of the reference subblock as motion information (e.g., a motion vector) of the current subblock within the current block. As described above, the decoding apparatus may derive an sbTMVP candidate based on a motion vector of an available reference subblock or base motion vector, and the motion vector derived as the sbTMVP candidate may be used as a motion vector for the current subblock.

The decoding apparatus may generate prediction samples of the current block based on the motion information for the subblocks within the current block (S1740).

In an embodiment, in a prediction mode in which prediction is performed based on subblock unit motion information (i.e., sbTMVP mode) for the current block, the decoding apparatus may generate prediction samples of the current block based on the above derived motion information for the current subblock.

The decoding apparatus may generate reconstruction samples based on the prediction samples (S1750).

In an embodiment, the decoding apparatus may directly use the prediction samples as the reconstruction samples according to the prediction mode, or may generate the reconstruction samples by adding the residual samples to the prediction samples.

If there are residual samples for the current block, the decoding apparatus may receive information on residual for the current block. The information on the residual may include transform coefficients relating to the residual samples. The decoding apparatus may derive the residual samples (or residual sample array) for the current block based on the residual information. The decoding apparatus may generate the reconstruction samples based on the prediction samples and the residual samples and derive a reconstruction block or reconstruction picture based on the reconstruction samples. Afterwards, the decoding apparatus may apply an in-loop filtering procedure such as a deblocking filtering and/or SAO procedure to the reconstruction picture as described above, in order to improve subjective/objective image quality when necessary.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 19:
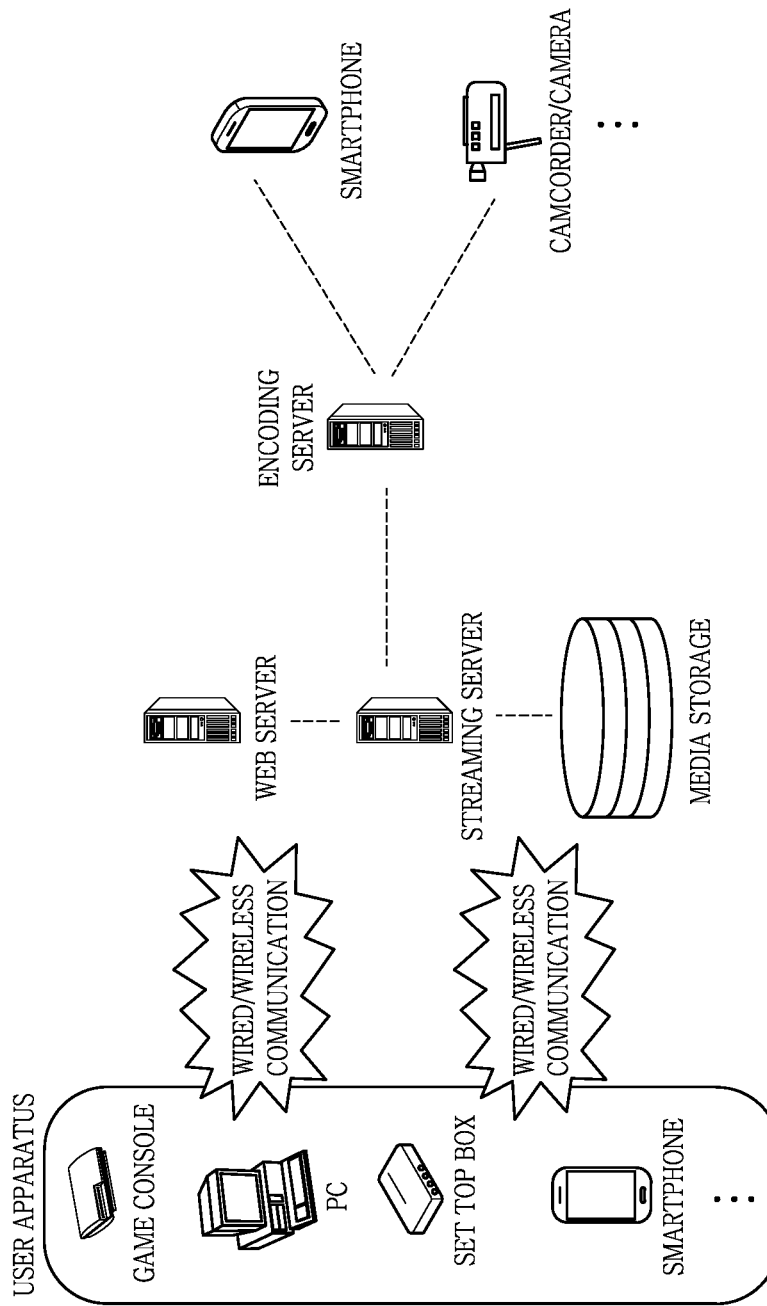
FIG. 19 illustrates an example of a content streaming system to which embodiments disclosed in this document may be applied.

FIG. 19 illustrates an example of a content streaming system to which embodiments disclosed in this document may be applied.

Referring to FIG. 19, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. A decoding apparatus for image decoding, the decoding apparatus comprising:
  a memory; and
  at least one processor connected to the memory, the at least one processor configured to:
  derive a position of a current subblock within a current block based on a center sample position of the current subblock;
  derive a reference subblock on a collocated reference picture based on the position of the current subblock;

derive a subblock temporal motion vector predictor (sbTMVP) candidate based on a motion vector of the reference subblock;

derive a motion vector of the current subblock based on the sbTMVP candidate;

generate prediction samples of the current block based on the motion vector of the current subblock;

generate residual samples of the current block based on residual information obtained from a bitstream; and generate reconstruction samples based on the prediction samples and the residual samples, wherein the center sample position represents a position of a right-lower center sample positioned at a bottom right, among four samples positioned at the center, wherein for the reference subblock that is available, a motion vector of the available reference subblock is derived as the sbTMVP candidate, wherein the motion vector of the available reference subblock is derived based on a motion vector of a block covering a modified location derived based on a top-left sample position of the reference subblock, and wherein the modified location is derived by an equation $((xColSb>>3)<<3, (yColSb>>3)<<3)$, where the xColSb and the yColSb represent the x coordinate and y coordinate of the sample position of the reference subblock derived based on the center sample position of the current subblock, respectively, and $>>$ represents an arithmetic right shift, and $<<$ represents an arithmetic left shift.

2. An encoding apparatus for image encoding, the encoding apparatus comprising:

a memory; and at least one processor connected to the memory, the at least one processor configured to:

derive a position of a current subblock within a current block based on a center sample position of the current subblock;

derive a reference subblock on a collocated reference picture based on the position of the current subblock;

derive a subblock temporal motion vector predictor (sbTMVP) candidate based on a motion vector of the reference subblock;

derive a motion vector of the current subblock based on the sbTMVP candidate;

generate prediction samples of the current block based on the motion vector of the current subblock;

generate residual samples derived based on the prediction samples; and encode image information including information on the residual samples, wherein the center sample position represents a position of a right-lower center sample positioned at a bottom right, among four samples positioned at the center, wherein for the reference subblock that is available, a motion vector of the available reference subblock is derived as the sbTMVP candidate, wherein the motion vector of the available reference subblock is derived based on a motion vector of a block covering a modified location derived based on a top-left sample position of the reference subblock, and wherein the modified location is derived by an equation $((xColSb>>3)<<3, (yColSb>>3)<<3)$, where the xColSb and the yColSb represent the x coordinate and y coordinate of the sample position of the reference subblock derived based on the center sample position of the current subblock, respectively, and $>>$ represents an arithmetic right shift, and $<<$ represents an arithmetic left shift.

3. An apparatus for transmitting data for an image, the apparatus comprising:

at least one processor configured to obtain a bitstream for the image, wherein the bitstream is generated based on deriving a position of a current subblock within a current block based on a center sample position of the current subblock, deriving a reference subblock on a collocated reference picture based on the position of the current subblock, deriving a subblock temporal motion vector predictor (sbTMVP) candidate based on a motion vector of the reference subblock, deriving a motion vector of the current subblock based on the sbTMVP candidate, generating prediction samples of the current block based on the motion vector of the current subblock, generating residual samples derived based on the prediction samples, and encoding image information including information on the residual samples to output the bitstream; and a transmitter configured to transmit the data comprising the bitstream, wherein the center sample position represents a position of a right-lower center sample positioned at a bottom right, among four samples positioned at the center, wherein for the reference subblock that is available, a motion vector of the available reference subblock is derived as the sbTMVP candidate, wherein the motion vector of the available reference subblock is derived based on a motion vector of a block covering a modified location derived based on a top-left sample position of the reference subblock, and wherein the modified location is derived by an equation $((xColSb>>3)<<3, (yColSb>>3)<<3)$, where the xColSb and the yColSb represent the x coordinate and y coordinate of the sample position of the reference subblock derived based on the center sample position of the current subblock, respectively, and $>>$ represents an arithmetic right shift, and $<<$ represents an arithmetic left shift.

* * * * *